(12) United States Patent
Yasui et al.

(10) Patent No.: US 8,738,269 B2
(45) Date of Patent: May 27, 2014

(54) CONTROLLER

(75) Inventors: Yuji Yasui, Saitama (JP); Michael Fischer, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 13/000,602

(22) PCT Filed: Jul. 7, 2008

(86) PCT No.: PCT/JP2008/062291
§ 371 (c)(1),
(2), (4) Date: Dec. 21, 2010

(87) PCT Pub. No.: WO2010/004611
PCT Pub. Date: Jan. 14, 2010

(65) Prior Publication Data
US 2011/0106402 A1    May 5, 2011

(51) Int. Cl.
*G06F 19/00* (2011.01)
(52) U.S. Cl.
USPC ................... 701/101; 123/339.2; 123/352
(58) Field of Classification Search
USPC ............ 701/101, 84, 86, 108, 109, 110, 114; 123/339.1, 339.16, 339.19, 339.2, 350, 123/352, 426.23
See application file for complete search history.

(56) References Cited

U.S. PATENT DOCUMENTS

| | | | |
|---|---|---|---|
| 6,948,478 B2 * | 9/2005 | Fuwa et al. | 123/435 |
| 7,066,146 B2 * | 6/2006 | Fuwa et al. | 123/406.55 |
| 7,107,975 B2 * | 9/2006 | Fuwa et al. | 123/568.14 |
| 7,201,139 B2 * | 4/2007 | Fuwa et al. | 123/306 |

FOREIGN PATENT DOCUMENTS

| | | |
|---|---|---|
| JP | 09-187625 A | 7/1997 |
| JP | 2004-100700 A | 4/2004 |
| JP | 2006-226292 A | 8/2006 |
| JP | 2006-274986 A | 10/2006 |
| JP | 2007-056879 A | 3/2007 |
| WO | WO 01/01205 A2 | 1/2001 |

OTHER PUBLICATIONS

Notice of Reasons for Rejection issued in Japanese Patent Application No. 2010-519576, mailed Aug. 14, 2012.
Supplemental European Search Report dated Mar. 21, 2012 issued in corresponding European Application No. 08777953.4.

* cited by examiner

*Primary Examiner* — John Kwon
(74) *Attorney, Agent, or Firm* — Arent Fox LLP

(57) ABSTRACT

A controller for controlling a plant comprises a predictor for calculating a predicted value of the future of a control output value based on a provisional value of a control input value including a periodic reference signal by using a plant model indicating the dynamic characteristics of the control output value from the control input value of the plant, an evaluation function value calculator for calculating an evaluation function value including the predicted value of the future of the calculated control output value, an extreme value search optimizer for calculating a provisional value of such a control input value as that the evaluation function value becomes the extreme value on the basis of a product of the calculated evaluation function value and a periodic reference signal, and an adder for calculating a control input value including the provisional value of the calculated control input value.

9 Claims, 16 Drawing Sheets

Related Art

CONTROLLER

CROSS-REFERENCE TO RELATED APPLICATION

This is a National Stage entry of International Application No. PCT/JP2008/062291, filed Jul. 7, 2008. The disclosure of the prior application is hereby incorporated herein in its entirety by reference.

TECHNICAL FIELD

The present invention relates to a controller. Specifically, it relates to a controller of a plant having a large response delay characteristic.

BACKGROUND ART

Conventionally, as one exhaust purification device that purifies NOx in exhaust, a device has been proposed in which a selective reduction catalyst that selectively reduces NOx in the exhaust by adding a reducing agent is provided in an exhaust channel. For example, a selective reduction catalyst of urea addition type that uses urea water as a reducing agent generates ammonia from the urea thus added, and selectively reduces NOx in the exhaust with this ammonia.

With such a selective reduction catalyst, in a case in which the injection amount of reducing agent is less than the optimum amount, the NOx reduction rate declines from the ammonia consumed in the reduction of NOx being deficient, and in a case of being greater than this optimum amount, the ammonia that is surplus in the reduction of NOx is discharged. As a result, with exhaust purification devices equipped with a selective reduction catalyst, it has been important to appropriately control the injection amount of the reducing agent. Consequently, devices that estimate the NOx reduction rate of the selective reduction catalyst and control the injection amount of the reducing agent based on this estimation are exemplified in Patent Document 1 (Japanese Unexamined Patent Application Publication No. 2006-274986) and Patent Document 2 (Japanese Unexamined Patent Application Publication No. 2004-100700).

The exhaust purification device of Patent Document 1 detects the NOx concentration on a downstream side of the selective reduction catalyst, and estimates the composition of exhaust flowing into the selective reduction catalyst, i.e. the ratio of NO to $NO_2$, from this detected NOx concentration and the operating state of the internal combustion engine. Furthermore, it estimates the NOx reduction rate of the selective reduction catalyst based on the composition of this exhaust, and controls the injection amount of the reducing agent.

In addition, the exhaust purification device of Patent Document 2 detects the temperature of the catalyst as an amount related to the NOx reduction rate of the selective reduction catalyst, and controls the injection amount of the reducing agent based on this temperature.

However, the NOx reduction rate of the selective reduction catalysts change not only by the aforementioned such composition of the exhaust and temperature of the selective reduction catalyst, but also according to the degradation state of the selective reduction catalyst. In addition, there is variation in purification performance between individual catalysts. In addition to this, in a case of ammonia being stored in the selective reduction catalyst, the NOx reduction rate of the selective reduction catalyst will apparently change due to the optimum amount of reducing agent differing. Therefore, it is difficult to always optimally control the injection amount of reducing agent with exhaust purification devices such as those exemplified in Patent Documents 1 and 2.

Consequently, technology to more directly detect the NOx purification rate of a selective reduction catalyst and to control the injection amount of reducing agent based on this will be considered hereinafter.

FIG. 16 is a schematic diagram showing a configuration of a conventional exhaust purification device 80.

As shown in FIG. 16, in an exhaust channel 82 of an engine 81 are provided, in order from an upstream side to a downstream side, an oxidation catalyst 83, a urea injection value 85 that injects urea water as a reducing agent, which is stored in a urea tank 84, into the exhaust channel 82, and a selective reduction catalyst 86 that reduces NOx in the exhaust under the presence of urea water. In addition, as a device that monitors the purification performance of the selective reduction catalyst, a temperature sensor 87 that detects the temperature of the selective reduction catalyst 86 and a NOx sensor that detects the NOx concentration on a downstream side of the selective reduction catalyst 86 are provided.

With this exhaust purification device 80, for example, the NOx concentration of exhaust emitted from the engine 81 is estimated using a map established beforehand, and an injection amount of urea water from the urea injection value 85 is determined based on this NOx concentration and the catalyst temperature detected by the temperature sensor 87. In particular, the degradation state of the selective reduction catalyst 86 can be estimated here based on a difference between the NOx concentration detected by the NOx sensor 88 and the NOx concentration of exhaust estimated. With this exhaust purification device, it is possible to correct the injection amount of urea water according to the degradation state of the selective reduction catalyst 86 estimated in the above way.

DISCLOSURE OF THE INVENTION

Problems to be Solved by the Invention

FIG. 17 presents graphs showing relationships between a NOx concentration and ammonia concentration in exhaust downstream of the selective reduction catalyst and the output value of the NOx sensor in a conventional exhaust purification device. More specifically, FIG. 17 shows, in order from the top, relationships between the urea injection amount and the NOx concentration of exhaust downstream of the selective reduction catalyst, the ammonia concentration of exhaust downstream of the selective reduction catalyst, and the output value of the NOx sensor.

When the injection amount of urea water increases, the NOx reduction rate of the selective reduction catalyst rises due to the ammonia generated in the selective reduction catalyst also increasing. As a result, the NOx concentration on a downstream side of the selective reduction catalyst decreases accompanying the injection amount of urea water increasing, as shown in FIG. 17. In addition, if the urea water injection amount shown by the star is exceeded, the NOx concentration becomes substantially constant irrespective of the urea water injection amount. In other words, the urea water of an amount exceeding the star indicates being surplus in reducing the NOx generated.

In addition, herein, the ammonia generated from the urea water that becomes surplus is not consumed in the reduction of NOx, and is stored in the selective reduction catalyst or discharged to downstream of the selective reduction catalyst. Therefore, as shown in FIG. 17, the ammonia concentration of exhaust downstream of the selective reduction catalyst increases when the injection amount of urea water shown by the star is exceeded. It should be noted that the generated ammonia not being stored in the selective reduction catalyst and being discharged to downstream thereof in this way is hereinafter referred to as "ammonia slip".

As described above, since the urea water injection amount indicated by the star in FIG. 17 can both minimize the NOx concentration and ammonia concentration, it is the optimum injection amount for this exhaust purification system.

However, as shown in FIG. 17, the output value of the NOx sensor shows a downward convex characteristic in which the output value of this optimum injection amount is a minimum point. This is because existing NOx sensors in the detection principles thereof are sensitive not only to NOx, but also to ammonia.

Therefore, it is impossible to determine whether the injection amount of urea water is insufficient relative to the optimum injection amount or excessive, with only the output value from the NOx sensor. As a result, it is difficult to suppress the discharge of ammonia while continually supplying urea water of an optimum amount to maintain the NOx reduction rate of the selective reduction catalyst to be high.

Consequently, a case of using an ammonia sensor without using a NOx sensor will be considered. Although existing NOx sensors are sensitive not only to NOx, but also to ammonia, it has been known that is it possible to develop ammonia sensors that are sensitive to only ammonia without being sensitive to NOx.

FIG. 18 presents graphs showing relationships between the NOx concentration and ammonia concentration in exhaust downstream of the selective reduction catalyst and the output value of the $NH_3$ sensor in a conventional exhaust purification device using an ammonia sensor.

As shown in FIG. 18, the output value of the ammonia sensor differs from the output value of the NOx sensor and does not become downward convex, and shows an output characteristic proportional to the actual ammonia concentration downstream of the selective reduction catalyst. As a result, it has been considered to perform feedback control on the urea water injection amount so as to suppress ammonia slip based on the output value of the ammonia sensor, by way of a conventionally known control method such as PID control or sliding mode control.

However, it has also been known that the ammonia slip of the selective reduction catalyst has a large response delay relative to the injection amount of urea water. In general, in a case of performing feedback control on a control object having a large delay characteristic, the tracking characteristic of the detected value to the target value is poor, and it takes time until the detected value matches the target value. In addition, if the tracking characteristic of the detected value to the target value is improved, overshoot and hunting will occur. In particular, in a case of the aforementioned such exhaust purification device using a selective reduction catalyst being set as the control object, if the detected value cannot be quickly and highly precisely controlled to the target value, the NOx reduction rate of the selective reduction catalyst will decline, and ammonia slip will occur.

The present invention has been made taking the aforementioned points into consideration, and has an object of providing a controller of a control object having a large delay characteristic that can quickly and highly precisely control a detected value to a target value.

Means for Solving the Problems

In order to achieve the above-mentioned object, according to a first aspect of the invention, a controller (3, 7) for controlling a plant (2, 6) includes: a predicted value calculating means (511, 712) for calculating, using a plant model showing a dynamic characteristic of a control output value ($NH3_{CONS}$, $DNH3_{CONS}$, $W_{S\_ACT}$) from a control input value ($G_{UREA}$, TRQ) of the plant, a future predicted value ($PREDNH3_{EXS}$, $PREW_{S\_EXS}$) of a control output value based on a provisional value ($DG_{UREA\_EXS}$, $DTRQ_{EXS}$, $TRQ_{EXS}$) of a control input value containing a periodic reference signal ($S_{REF}$, $S_{REF'}$); an evaluation function value calculating means (512, 713) for calculating an evaluation function value (J, J', J'') containing the future predicted value ($PREDNH3_{EXS}$, $PREW_{S\_EXS}$) of the control output value thus calculated; an extremum searching means (513, 714) for calculating, based on a product ($C_R$, $C_{R\_AVE}$, $C_{R'}$, $C_{R\_AVE'}$) of the evaluation function value (J, J', J'') thus calculated and the periodic reference signal ($S_{REF}$, $S_{REF'}$) a provisional value ($DG_{UREA\_OPT}$, $DG_{UREA\_EXS}$, $DTRQ_{OPT}$, $DTRQ_{EXS}$) of a control input value so that the evaluation function value (J, J', J'') becomes an extremum; and a control input value calculating means (54, 76) for calculating a control input value ($G_{UREA}$, TRQ) containing the provisional value ($DG_{UREA\_OPT}$, $DTRQ_{OPT}$) of the control input value thus calculated.

According to a second aspect of the invention, in the controller (3, 7) as described in the first aspect, an update period ($\Delta Te$) of a provisional value ($DG_{UREA\_OPT}$, $DG_{UREA\_EXS}$, $DTRQ_{OPT}$, $DTRQ_{EXS}$) of a control input value is shorter than an update period ($\Delta Ti$, $\Delta Tc$) of the control input value ($G_{UREA}$, TRQ).

According to a third aspect of the invention, the controller (3, 7) as described in the first or second aspect further includes: a target value correction means (52, 74) for setting, for a target value ($NH3_{CONS\_TRGT}$, $W_{S\_CMD}$) of a control output value, a corrected target value ($NH3_{CONS\_TRGT\_MOD}$, $W_{S\_CMD\_MOD}$) of the control output value between the target value ($NH3_{CONS\_TRGT}$, $W_{S\_CMD}$) of the control output value and a control output value ($NH3_{CONS}$, $W_{S\_ACT}$), in which the evaluation function value calculating means calculates the evaluation function value (J, J', J'') based on a deviation between the corrected target value ($NH3_{CONS\_TRGT\_MOD}$, $W_{S\_CMD\_MOD}$) of the control output value thus calculated and the future predicted value ($PREDNH3_{EXS}$, $PREW_{S\_EXS}$) of the control output value thus calculated.

According to a fourth aspect of the invention, in the controller (3, 7) as described in any one of the first to third aspects, the predicted value calculating means calculates future predicted values ($PREDNH3_{EXS}$, $PREW_{S\_EXS}$) of a control output value at a plurality of different times, and the evaluation function value calculating means calculates an evaluation function value (J, J', J'') containing the future predicted values of the control output value at the plurality of different times thus calculated.

According to a fifth aspect of the invention, in the controller (3, 7) as described in the fourth aspect, the plant model showing the dynamic characteristic of the control output value ($NH3_{CONS}$, $DNH3_{CONS}$, $W_{S\_ACT}$) from the control input value ($G_{UREA}$, TRQ) of the plant includes a plurality of control input terms proportional to the control input value, and a plurality of control output terms proportional to the control output value, and the predicted value calculating means calculates a future predicted value ($PREDNH3_{EXS}$, $PREW_{S\_EXS}$) of the control output value at a plurality of different times by recursively using output of the plant model in the control output terms.

According to a sixth aspect of the invention, in the controller (3, 7) as described in the fifth aspect, the predicted value calculating means calculates a future predicted value ($PREDNH3_{EXS}$, $PREW_{S\_EXS}$) of a control output value at a plurality of different times by recursively using, in the control output terms, output of the plant model in which a provisional value ($DG_{UREA\_OPT}$, $DTRQ_{OPT}$) of a control input value not containing a periodic reference signal was used in the control input terms.

According to a seventh aspect of the invention, in the controller (3, 7) as described in the fifth or sixth aspect, the predicted value calculating means uses a provisional value ($DG_{UREA\_EXS}$, $DTRQ_{EXS}$) of a control input value containing a periodic reference signal ($S_{REF}$, $S_{REF'}$) only in a portion of the plurality of control input terms.

According to an eighth aspect of the invention, in the controller (3) as described in any one of the first to seventh aspects, the plant is an exhaust purification device including: a selective reduction catalyst (231) that is provided in an exhaust channel of an internal combustion engine, and reduces NOx flowing through the exhaust channel under the presence of a reducing agent; a reducing agent supply means (25) for supplying a reducing agent into the exhaust channel on an upstream side of the selective reduction catalyst; and an exhaust detection means (26) for detecting exhaust in the exhaust channel on a downstream side of the selective reduction catalyst, in which control output values of the plant include an output value ($NH3_{CONS}$) of the exhaust detection means, and control input values of the plant include a supply amount ($G_{UREA}$) of the reducing agent from the reducing agent supply means.

According to a ninth aspect of the invention, in the controller (7) as described in any one of the first to seventh aspects, the plant is a vehicle including: a wheel (61); a drive source that produces torque for rotationally driving the wheel; and a drive wheel speed detection means for detecting a rotational speed of the wheel that is rotationally driven by the drive source, in which control output values of the plant include a detected value ($W_{S\_ACT}$) of the drive wheel speed detection means, and control input values of the plant include a target value (TRQ) of torque of the drive source.

Effects of the Invention

According to the first aspect of the invention, the future predicted value of a control output value based on a provisional value of a control input value containing the periodic reference signal is calculated using a plant model showing the dynamic characteristic of the control output value from the control input value of the plant. Furthermore, the evaluation function value containing the future predicted value of this control output value is calculated, a provisional value of the control input value such that the evaluation function value becomes an extremum is calculated based on the product of this evaluation function value and the reference signal, and a control input value containing this provisional value of the control input value is calculated.

With this, when controlling a plant having a large response delay between a control input value and a control output value, it is possible to cause this control output value to match the target value in a short time with high precision, while suppressing overshoot and oscillatory behavior of the control output value relative to a predetermined target value. In addition, this enables the operational load to be reduced on the order of several to tens of times compared to model prediction control by convention evaluation norm. Therefore, even in a case in which a computing device having high computing power cannot be used due to being in an adverse environment such as high temperature, high humidity, high vibration, or dust, it is possible to perform control with high precision using an computational device of a simple configuration.

According to the second aspect of the present invention, the update period of this provisional value of the control input value is set to be shorter than the update period of the control input value actually input to the plant. This enables oscillations when optimizing the provisional value of the control input value to be prevented from appearing in the control input value input to the plant. Therefore, it is possible to stably control the plant.

According to the third aspect of the present invention the corrected target value, for the target value of the control output value, is set between this target value and the control output value, the evaluation function value is calculated based on the deviation between this corrected target value and the future predicted value of the control output value, and the provisional value of the control input value is calculated based on this evaluation function value. This enables overshoot and oscillatory behavior of the control output value relative to the target value to be further suppressed.

According to the fourth aspect of the present invention, future predicted values of the control output value are calculated at a plurality of different times, an evaluation function value containing these future predicted values of the control output value at different times are calculated, and a provisional value of the control input value is calculated based on this evaluation function value. This enables overshoot and oscillatory behavior of the control output value relative to the target value to be further suppressed for a control object having a large delay characteristic.

According to the fifth aspect of the present invention, a plant model containing a plurality of control input terms proportional to a control input value and a plurality of control output terms proportional to a control output value is established, and the future predicted values of the control output value at a plurality of different times are calculated by recursively using output of this plant model in a control output term. In this way it is possible to reduce the computational load by calculating future predicted values of the control output value at a plurality of different times with a recursive operation.

According to the sixth aspect of the invention, the future predicted values of the control output value is calculated at a plurality of different times by way of recursively using, in the control output term, the output of the plant model using the provisional value of the control input value not containing the periodic reference signal in the control input term.

Herein, when recursively using the output of the plant model as described above, the influence of the periodic reference signal is accumulated, a result of which the convergence property of the control output value to the target value may decline. According to the present invention, the convergence property of the control output value to the target value can be prevented from declining by recursively using the output of the plant model using a provisional value of the control input value not containing the reference signal. Therefore, overshoot and oscillatory behavior of the control output value relative to the target value can be further suppressed.

According to the seventh aspect of the present invention, the provisional value of the control input value containing the periodic reference signal is only used in a portion of the plurality of control input terms of the plant model.

Herein, in a case of the plant model having a plurality of control input terms, an old control input value may be used in this plurality of control input terms when calculating a relatively close future predicted value. In this situation, if the provisional value of the control input value containing the reference signal is used in a plurality of control input terms, the influence of this control input value containing the reference signal will be redundant, a result of which the convergence property of the control output value to the target value may decline. According to the present invention, such a redundancy can be avoided and the convergence property of the control output value to the target value can be prevented from declining by only using the provisional value of the control input value containing the reference signal in a portion of the plurality of control input terms. Therefore, overshoot and oscillatory behavior of the control output value relative to the target value can be further suppressed.

According to the eighth aspect of the present invention, the supply amount of the reducing agent can be controlled by the controller so that the output value of the exhaust detection means matches a predetermined target value. Such an exhaust purification device using a selective reduction catalyst is a system having a large delay in the response to the supply of reducing agent. With the controller, it is possible to causes the output value of the exhaust detection means to quickly and highly precisely match a target value set so that the exhaust purification efficiency of the exhaust purification device is optimal, even for such a system in which the response delay is large. In this case as well, overshoot and oscillatory behavior of the output value relative to the target value can be suppressed. This enables the exhaust purification performance of the exhaust purification device to be improved.

According to the ninth aspect of the present invention, the target value of torque of the drive source can be controlled by the controller so that the detected value of the drive wheel speed detection means matches a predetermined target value. A vehicle transfers torque generated by the drive source to the wheels through devices having large inertial mass such as the driveshaft, propeller shaft, crank, transmission. As a result, such a vehicle is a system having a large response delay in relation to the generated torque of the drive source. The revolution speed of a drive wheel can be quickly and highly precisely caused to match a predetermined target value by the controller, even for such a system in which the response delay is large. In this case as well, overshoot and oscillatory behavior of the detected value relative to the target value can be suppressed. This enables the acceleration performance and stability of the vehicle to be improved.

EXPLANATION OF REFERENCE NUMERALS

Figure 1:
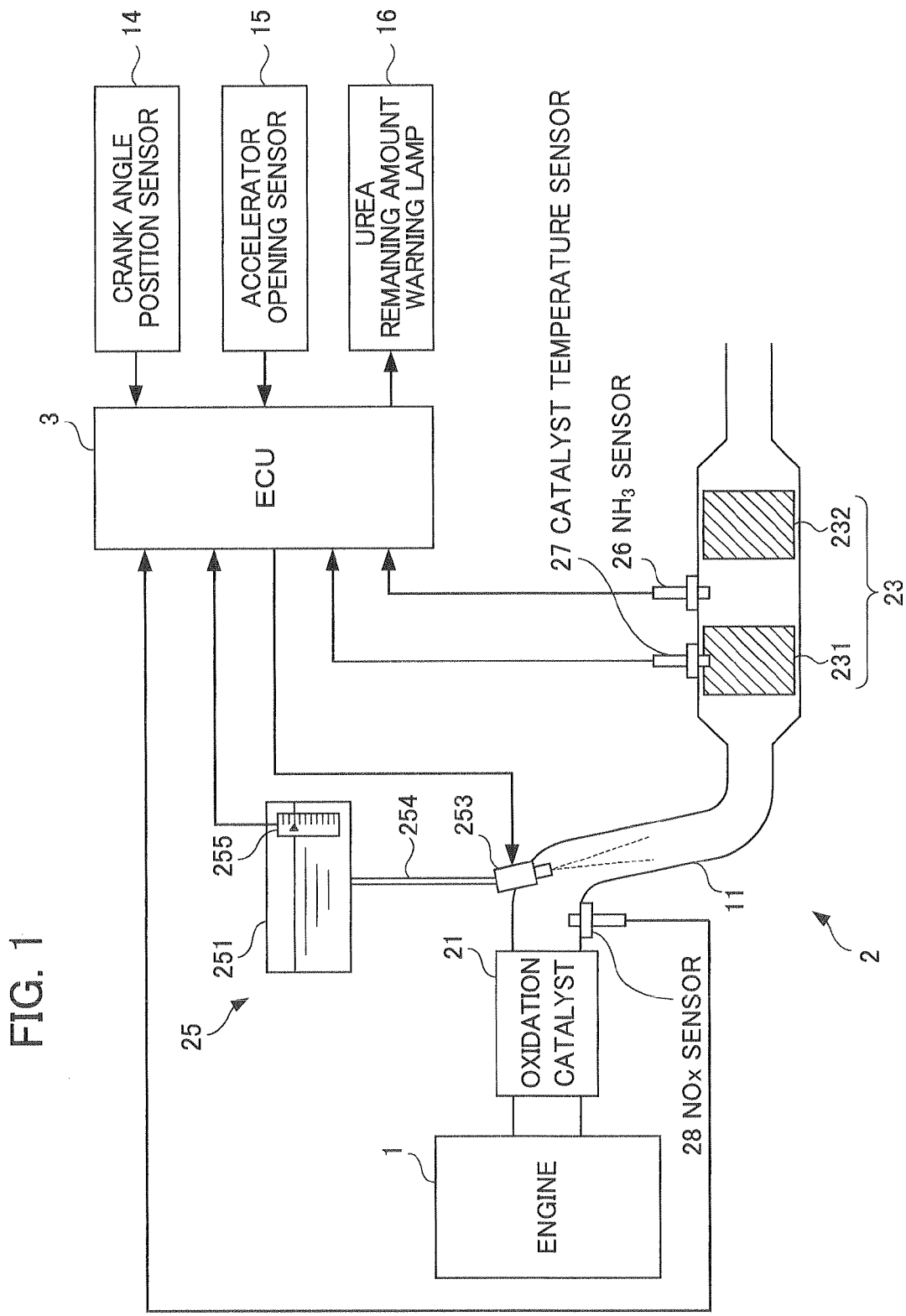
FIG. 1 is a schematic diagram showing configurations of an ECU and an exhaust purification device of an engine controlled by this ECU according to a first embodiment of the present invention.

1 engine (internal combustion engine)
2 exhaust purification device (plant)
231 first selective reduction catalyst (selective reduction catalyst)
25 urea injection device (reducing agent supply means)
26 ammonia sensor (exhaust detection means)
3 ECU (controller)
51 feedback controller
511 predictor (predicted value calculating means)
512 evaluation function value calculating unit (evaluation function value calculating means)
513 extremum searching optimization unit (extremum searching means)
52 target value correction portion (target value correction means)
54 adder (control input value calculating means)
6 vehicle (plant)
61 drive wheel (wheel)
7 ECU (controller)
71 feedback controller
712 predictor (predicted value calculating means)
713 evaluation function value calculating unit (evaluation function value calculating means)
714 extremum searching optimization unit (extremum searching means)
72 feedforward controller
74 target value correction portion (target value correction means)
76 adder (control input value calculating means)

PREFERRED MODE FOR CARRYING OUT THE INVENTION

First Embodiment

Hereinafter, a first embodiment of the present invention will be explained while referring to the drawings.

FIG. 1 is a schematic diagram showing configurations of an electronic control unit (hereinafter referred to as "ECU") 3 as a controller, and an exhaust purification device 2 of an internal combustion engine (hereinafter referred to as "engine") 1 as a plant controlled by this ECU 3, according to the first embodiment of the present invention. The engine 1 is a gasoline engine of lean-burn operating type or a diesel engine, and is mounted in a vehicle, which is not illustrated.

The exhaust purification device 2 is configured to include an oxidation catalyst 21 provided in an exhaust channel 11 of the engine 1, a urea selective reduction catalyst 23 that is provided in the exhaust channel 11 and purifies nitrogen oxides (hereinafter referred to as "NOx") in exhaust flowing through this exhaust channel 11 under the presence of a reducing agent, and a urea injection device 25 that supplies urea water as a reducing agent into the exhaust channel 11 on an upstream side of the urea selective reduction catalyst 23, and is controlled by the ECU 3.

The urea injection device 25 includes a urea tank 251 and a urea injection value 253.

The urea tank 251 stores urea water, and is connected to the urea injection valve 253 via a urea supply pipe 254 and a urea pump, which is not illustrated. A urea level sensor 255 is provided to this urea tank 251. This urea level sensor 255 detects the water level of the urea water in the urea tank 251, and outputs a detection signal substantially proportional to this water level to the ECU 3.

The urea injection valve 253 is connected to the ECU 3, operates according to a control signal from the ECU 3, and injects urea water into the exhaust channel 11 in accordance with this control signal. In other words, urea injection control is executed.

The oxidation catalyst 21 is provided more on an upstream side in the exhaust channel 11 than the urea selective reduction catalyst 23 and the urea injection valve 253, and converts NO in the exhaust to $NO_2$, thereby promoting the reduction of NOx in the urea selective reduction catalyst 23.

The urea selective reduction catalyst 23 is configured to include a first selective reduction catalyst 231, and a second selective reduction catalyst 232 that is provided in the exhaust channel 11 more on a downstream side than the first selective reduction catalyst 231. This first selective reduction catalyst 231 and second selective reduction catalyst 232 each selectively reduce NOx in exhaust under an atmosphere in which ammonia water is present. More specifically, when urea water is injected by the urea injection device 25, ammonia is produced from the urea in this first selective reduction catalyst 231 and second selective reduction catalyst 232, and the NOx in the exhaust is selectively reduced by this ammonia.

In addition to an ammonia sensor 26 as an exhaust detection means, catalyst temperature sensor 27 and NOx sensor 28, a crank angle position sensor 14, accelerator opening sensor 15, and urea remaining amount warning light 16 are connected to the ECU 3.

The ammonia sensor 26 detects the concentration of ammonia (hereinafter referred to as "ammonia concentration") $NH3_{CONS}$ of exhaust in the exhaust channel 11 between the first selective reduction catalyst 231 and the second selective reduction catalyst 232, and supplies a detection signal substantially proportional to the ammonia concentration $NH3_{CONS}$ thus detected to the ECU 3.

The catalyst temperature sensor 27 detects a temperature (hereinafter referred to as "catalyst temperature") $T_{SCR}$ of the first selective reduction catalyst 231, and supplies a detection signal substantially proportional to the catalyst temperature $T_{SCR}$ thus detected to the ECU 3.

The NOx sensor 28 detects a concentration of NOx in the exhaust (hereinafter referred to as "NOx concentration") $NOX_{CONS}$ flowing into the first selective reduction catalyst 231, and supplies a detection signal substantially proportional to the NOx concentration $NOX_{CONS}$ thus detected to the ECU 3. More specifically, the NOx sensor 28 detects the NOx concentration of exhaust in the exhaust channel 11 on a more upstream side than a position at which urea water is supplied from the urea injection value 253.

The crank angle position sensor 14 detects a rotation angle of the crank shaft of the engine 1 along with generating a pulse at every 1° of crank angle, and supplies this pulse signal to the ECU 3. A revolution speed NE of the engine 1 is calculated by the ECU 3 based on this pulse signal. The crank angle position sensor 14 further generates a cylinder discriminating pulse at a predetermined crank angle position of a specific cylinder, and supplies this to the ECU 3.

The accelerator opening sensor 15 detects a depression amount (hereinafter referred to as "accelerator opening") AP of the accelerator pedal, which is not illustrated, of the vehicle, and supplies a detection signal substantially proportional to the accelerator opening AP thus detected to the ECU 3.

The urea remaining amount warning light 16 is provided in the instrument panel of the vehicle, for example, and illuminates in response to the remaining amount of urea water in the urea tank 251 having decreased past a predetermined remaining amount. With this, the fact that the remaining amount of urea water in the urea tank 251 has decreased is warned to the operator.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, urea injection valve 253, and the like, and executes the urea injection control described later.

Incidentally, the first selective reduction catalyst 231 and the second selective reduction catalyst 232 of the aforementioned urea selective reduction catalyst 23 each have a function of reducing NOx in the exhaust with the ammonia produced from urea as well as having a function of storing the ammonia produced in a predetermined amount.

Hereinafter, the ammonia amount stored in the first selective reduction catalyst 231 is defined as a first storage amount, and the ammonia amount that can be stored in the first selective reduction catalyst 231 is defined as a first storage capacity. In addition, the ammonia amount stored in the second selective reduction catalyst 232 is defined as a second storage amount, and the ammonia amount that can be stored in the second selective reduction catalyst 232 is defined as a second storage capacity.

The ammonia stored in this way is consumed as appropriate in the reduction of NOx in the exhaust. As a result, the NOx reduction rate of the selective reduction catalysts 231 and 232 increases in accordance with the first and second storage amounts increasing. In addition, in a case such as when the supply amount of urea water is small relative to the amount of NOx generated, the ammonia thus stored is consumed in the reduction of NOx so as to compensate for this deficient amount of urea water.

Herein, in a case of the ammonia produced exceeding the storage capacity of the selective reduction catalyst 231 and 232, respectively, the ammonia produced is discharged to downstream of each of the selective reduction catalysts 231 and 232. The ammonia not being stored in each of the selective reduction catalysts 231 and 232 and being discharged to downstream of each in this way is referred to hereinafter as "ammonia slip".

In order to continuously maintain the NOx reduction rate of such selective reduction catalysts 231 and 232 to be high, it is preferable to continuously maintain a state in which ammonia is stored in these selective reduction catalysts 231 and 231 in an amount close to the storage capacity of each. However, in a state in which ammonia of an amount near the storage capacity is stored in this way, it is easy for ammonia slip to occur, and thus ammonia may be discharged to outside the vehicle. In particular, it is preferable for ammonia slip of the second selective reduction catalyst 232 to be prevented as much as possible.

In light of the above such point, the ECU 3 of the present embodiment executes urea injection control of the exhaust purification device 3 based on a principle such as that shown below. More specifically, as shown in the following formula (1), a urea injection amount $G_{UREA}$ is shown as the sum of a feedback injection amount (hereinafter referred to as "FB injection amount") $G_{UREA\_FB}$ and a predetermined reference injection amount $G_{UREA\_BS}$.

$$G_{UREA} = G_{UREA\_FB} + G_{UREA\_BS} \quad (1)$$

The FB injection amount $G_{UREA\_FB}$ is a control input value for controlling so that the output value of the ammonia sensor 26, i.e. the detected ammonia concentration $NH3_{CONS}$, matches a predetermined target ammonia concentration $NH3_{CONS\_TRGT}$ and is determined according to the detected ammonia concentration $NH3_{CONS}$.

Figure 2:
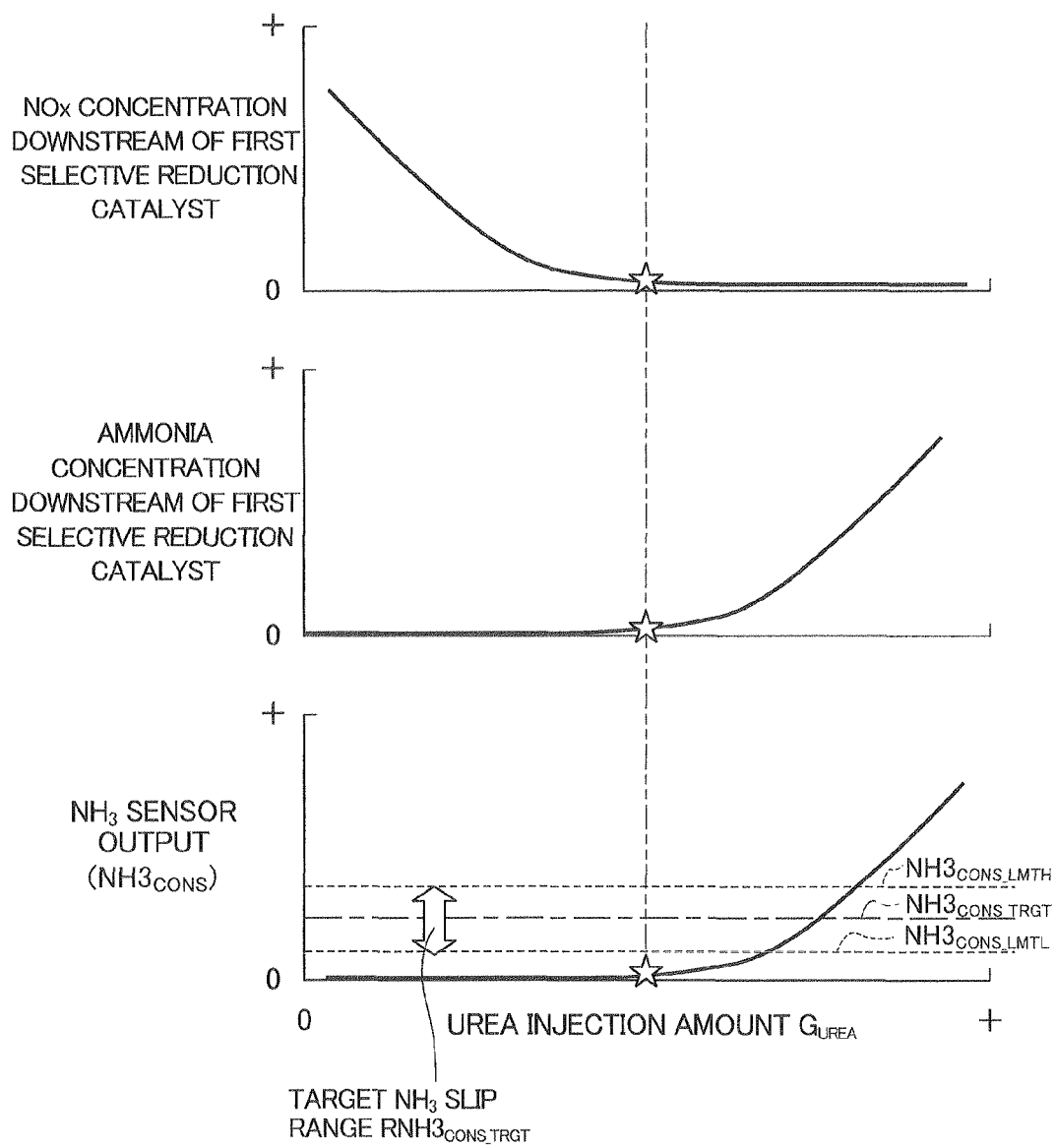
FIG. 2 presents graphs for illustrating the principle deciding an FB injection amount according to the embodiment.

FIG. 2 presents graphs for illustrating the principle determining the FB injection amount $G_{UREA\_FB}$. In FIG. 2, the horizontal axis indicates time, and the vertical axis indicates the NOx concentration downstream of the first selective reduction catalyst 231, the ammonia concentration downstream of the first selective reduction catalyst 231, and the detected ammonia concentration $NH3_{CONS}$, in order from the top.

The NOx reduction rate of the first selective reduction catalyst 231 rises when increasing the urea injection amount $G_{UREA}$, since the ammonia produced in the first selective reduction catalyst 231 also increases. As a result, the NOx concentration downstream of the first selective reduction catalyst 231 decreases accompanying an increase in the urea injection amount $G_{UREA}$, as shown in the top graph of FIG. 2. In addition, when the urea injection amount $G_{UREA}$ exceeds the injection amount shown by the star, the NOx reduction rate of the first selective reduction catalyst 231 becomes a maximum, and the NOx concentration becomes substantially constant irrespective of the urea injection amount $G_{UREA}$. In other words, the urea water of an amount exceeding the star is surplus relative to that reducing NOx in the first selective reduction catalyst 231, and indicates being discharged to the downstream side thereof. In addition, accompanying this, the ammonia concentration of the exhaust downstream of the first selective reduction catalyst 231 increases when the urea injection amount $G_{UREA}$ exceeds the injection amount shown by the star, as shown in the middle graph of FIG. 2.

More specifically, as shown in the bottom graph of FIG. 2, the target ammonia concentration $NH3_{CONS\_TRGT}$ is set to a value somewhat larger than "0", and a target ammonia slip range $RNH3_{CONS\_TRGT}$ is defined by a lower limit $NH3_{CONS\_LMTL}$ that is less than this target ammonia concentration $NH3_{CONS\_TRGT}$ and an upper limit $NH3_{CONS\_LMTH}$ that is larger than this. Then, the urea injection amount is controlled so that the output value of the ammonia sensor 26, i.e. the detected ammonia concentration $NH3_{CONS}$, matches the target ammonia concentration $NH3_{CONS\_TRGT}$ within the range of this target ammonia slip range $RNH3_{CONS\_TRGT}$. Herein, the target ammonia slip range $RNH3_{CONS\_TRGT}$ is preferably set taking into account the detection resolution of the ammonia sensor 26.

A state in which ammonia is saturated from the first selective reduction catalyst 231 can be maintained by performing control of the urea injection amount $G_{UREA}$ so that the detected ammonia concentration $NH3_{CONS}$ matches the target ammonia concentration $NH3_{CONS\_TRGT}$ that is somewhat larger than "0". With this, a high NOx reduction rate can be maintained in the first selective reduction catalyst 231.

In addition, even if the reduction of NOx in the first selective reduction catalyst 231 is insufficient, the NOx reduction rate as an overall of the first selective reduction catalyst 231 and the second selective reduction catalyst 232 can be maintained to be high by causing this remaining NOx and ammonia slipped to the second selective reduction catalyst 232 to react. In addition, ammonia slip by the second selective reduction catalyst 232 can also be prevented from occurring by setting the target ammonia concentration $NH3_{CONS\_TRGT}$ to a value somewhat larger than "0".

Problems of Urea Injection Control

Next, the problems that may occur in a case of performing urea injection control by way of convention feedback control based on the aforementioned such principle and problems observed by the inventors of the present application will be explained in detail.

Figure 3:
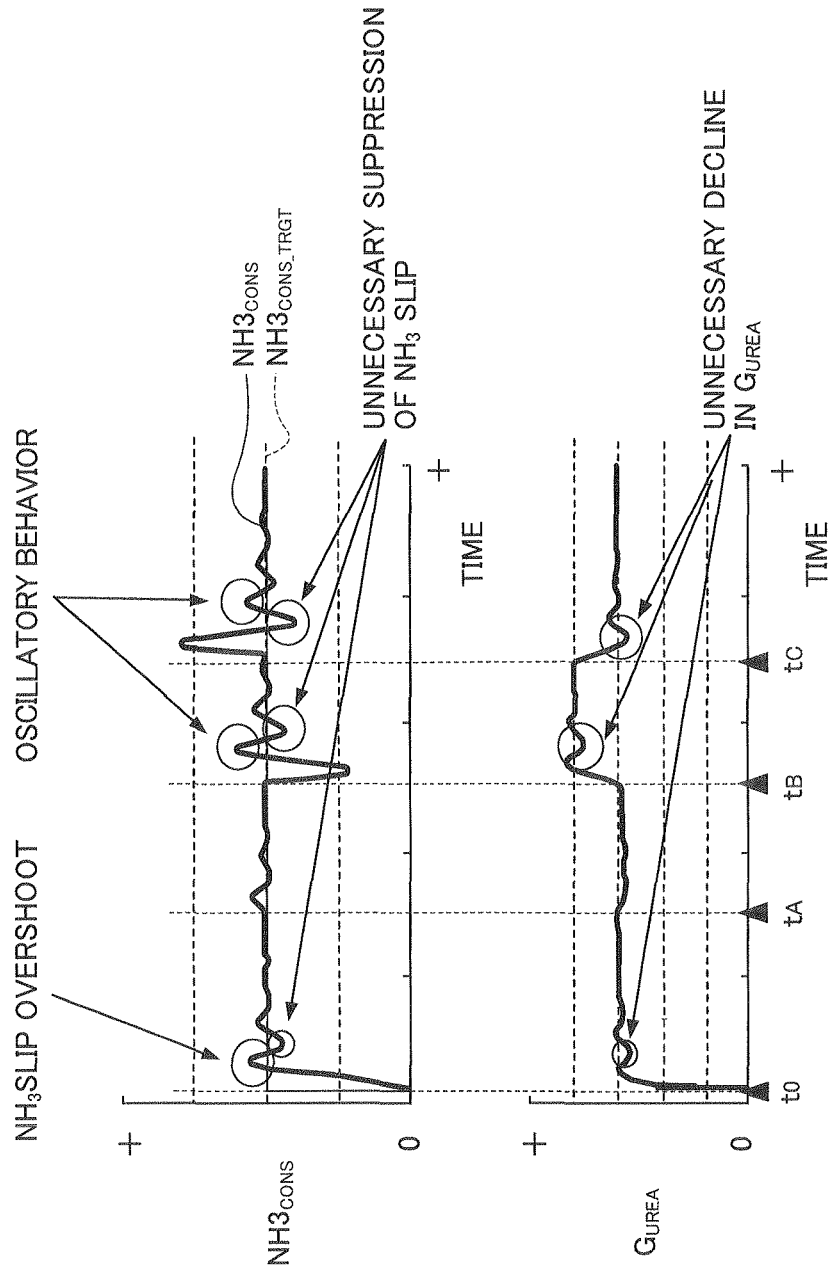
FIG. 3 presents graphs showing a relationship between a detected ammonia concentration and a urea injection amount in a case of performing urea injection control by way of conventional feedback control.

FIG. 3 presents graphs showing a relationship between a detected ammonia concentration $NH3_{CONS}$ and a urea injection amount $G_{UREA}$ in a case of performing urea injection control by way of conventional feedback control. In addition, in this example shown in FIG. 3, after causing the target ammonia concentration $NH3_{CONS\_TRGT}$ to increase step-wise from "0" to a predetermined value at time $t_0$, modeling error and noise were imparted at time $t_A$, time $t_B$ and time $t_C$.

At time $t_A$, the volume of exhaust was made to change as modeling error, with the NOx amount in the exhaust kept constant.

At time $t_B$, the NOx amount in the exhaust increased as noise. It should be noted that main causes for the NOx amount in the exhaust increasing may be the fuel injection timing being made to be advanced than a reference, the injection pattern being changed so that the diffusion combustion proportion increases, or the like.

At time $t_C$, the NOx amount in the exhaust decreases as noise. It should be noted that the primary causes for the NOx amount in the exhaust decreasing may be the fuel injection timing being made to be more retarded than a reference, the injection pattern being changed so that the premix combustion ratio increases, or the like.

As shown in FIG. 3, overshoot occurs in the detected ammonia concentration $NH3_{CONS}$ immediately after the target ammonia concentration $NH3_{CONS\_TRGT}$ is made to change step-wise at time $t_0$. In addition, immediately after overshoot occurs, the detected ammonia concentration $NH3_{CONS}$ decreases more than necessary, and the detected ammonia concentration $NH3_{CONS}$ shows oscillatory behavior as a result. In addition, immediately after applying noise or modeling error at times $t_B$ and $t_C$, the detected ammonia concentration $NH3_{CONS}$ shows overshoot and oscillatory behavior relative to the target ammonia concentration $NH3_{CONS\_TRGT}$. This behavior is considered to originate from the fact that there is a large delay characteristic between the urea injection amount $G_{UREA}$ and the detected ammonia concentration $NH3_{CONS}$.

If such an oscillatory behavior occurs and the detected ammonia concentration $NH3_{CONS}$ exceeds the target ammonia concentration $NH3_{CONS\_TRGT}$, the ideal balance between the ammonia amount consumed in the reduction of NOx in the second selective reduction catalyst and the ammonia amount emitted from the first selective reduction catalyst to the second selective reduction catalyst will be broken, and the ammonia storage amount of the second selective reduction catalyst will gradually increase. As described above, with the exhaust purification device of the present embodiment provided with the two selective reduction catalysts of the first selective reduction catalyst and the second selective reduction catalyst, even if oscillatory behavior occurs in the detected ammonia concentration $NH3_{CONS}$, ammonia slip of the second selective reduction catalyst will not occur immediately. However, if such oscillatory behavior continues over an extended period of time, ammonia slip of the second selective reduction catalyst will also occur, and an unpleasant odor may emanate from the tailpipe of the vehicle.

In addition, as shown in FIG. 3, the oscillatory behavior of the detected ammonia concentration $NH3_{CONS}$ originates from the oscillatory behavior of the urea injection amount $G_{UREA}$. In other words, it is shown that, at the times when the detected ammonia concentration $NH3_{CONS}$ falls below the target ammonia concentration $NH3_{CONS\_TRGT}$, the urea injection amount immediately prior thereto had been decreased more than necessary. The selective reduction catalyst has a characteristic whereby the reduction rate of NOx declines considerably if the urea injection amount $G_{UREA}$ decreases more than necessary. Therefore, when oscillatory behavior occurs in the detected ammonia concentration $NH3_{CONS}$, the NOx reduction rate of the first selective reduction catalyst may decline considerably.

In a case of performing urea injection control by conventional feedback control as described above, there are concerns such as of the occurrence of ammonia slip and a decline in the NOx reduction rate due to the response delay between the urea injection amount $G_{UREA}$ and the detected ammonia concentration $NH3_{CONS}$. A detailed configuration of the controller according to the invention of the present application, which has been made taking into account the above such problems of conventional feedback control, will be explained hereinafter.

Figure 4:
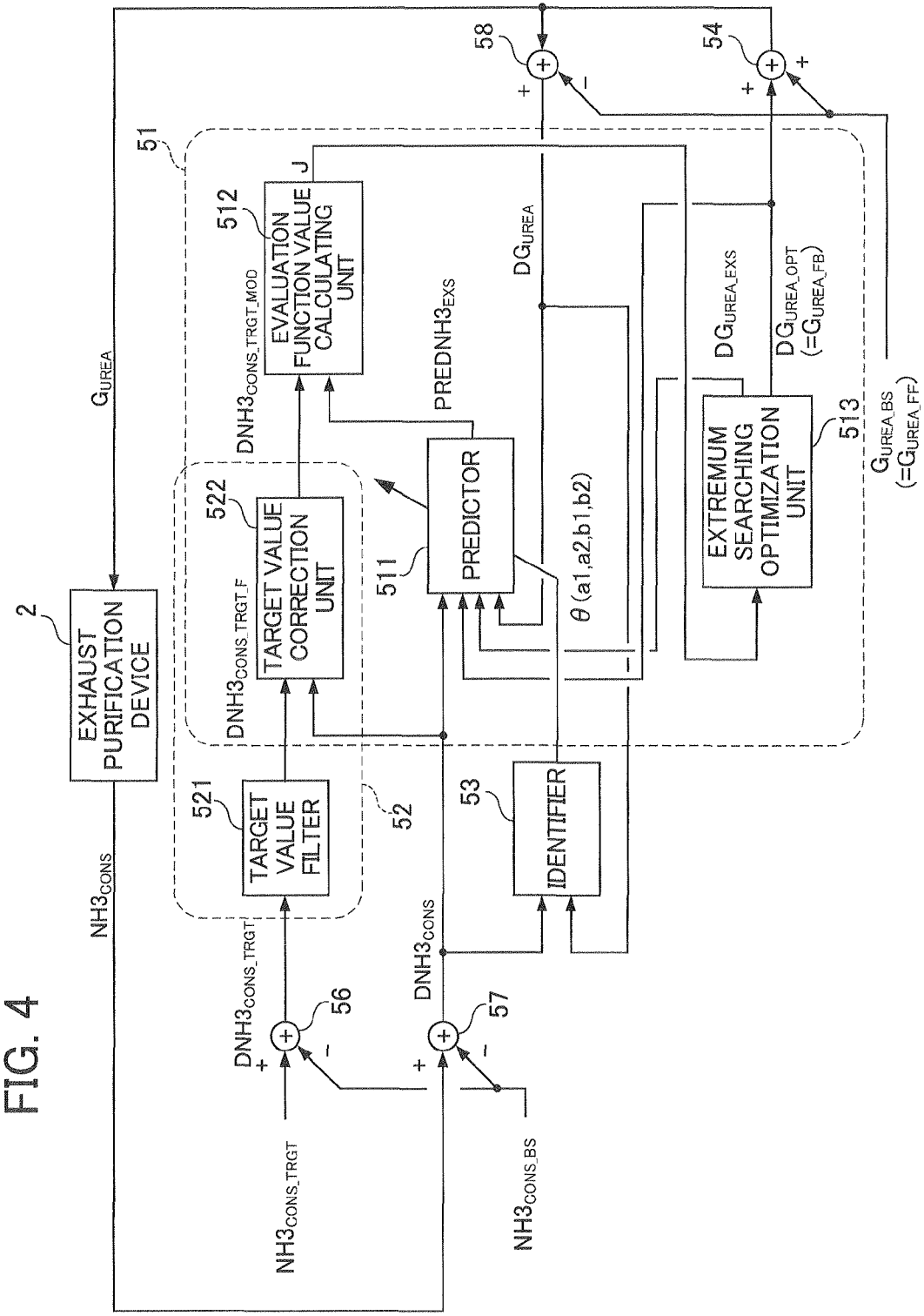
FIG. 4 is a block diagram showing a configuration of a module calculating the urea injection amount according to the embodiment.

FIG. 4 is a block diagram showing the configuration of a module calculating the urea injection amount $G_{UREA}$. This module controls the exhaust purification device 2, setting the urea injection amount $G_{UREA}$ from the urea injection device as a control input value and setting the detected ammonia concentration $NH3_{CONS}$ from the ammonia sensor as a control output value. The functions of this module are realized by processing executed by the ECU 3.

The module shown in FIG. 4 is configured to include a feedback controller 51 that calculates the FB injection amount $G_{UREA\_FB}$, a target value correction portion 52 that corrects the target ammonia concentration $NH3_{CONS\_TRGT}$, an identifier 53 that identifies a plurality of model parameters used by the feedback controller 51, and a plurality of adders 54, 56, 57 and 58.

The feedback controller 51 includes a target value correction unit 522, a predictor 511, an evaluation function value calculating unit 512, and an extremum searching optimization unit 513, and calculates the FB injection amount $G_{UREA\_FB}$ so that the detected ammonia concentration $NH3_{CONS}$ matches the target ammonia concentration $NH3_{CONS\_TRGT}$.

For convenience of operation, this feedback controller 51 handles a detected ammonia concentration difference $DNH3_{CONS}$ and a target ammonia concentration difference $DNH3_{CONS\_TRGT}$ obtained by subtracting the detected ammonia concentration $NH3_{CONS}$ and the target ammonia concentration $NH3_{CONS\_TRGT}$ from a predetermined reference value $NH3_{CONS\_BS}$, without directly handling this detected ammonia concentration $NH3_{CONS}$ and target ammonia concentration $NH3_{CONS\_TRGT}$.

This detected ammonia concentration difference $DNH3_{CONS}$ and target ammonia concentration difference $DNH3_{CONS\_TRGT}$ are respectively calculated by the adders 56 and 57, as shown in the following formulas (2) and (3).

$$DNH3_{CONS} = NH3_{CONS} - NH3_{CONS\_BS} \quad (2)$$

$$DNH3_{CONS\_TRGT} = NH3_{CONS\_TRGT} - NH3_{CONS\_BS} \quad (3)$$

Herein, the reference value $NH3_{CONS\_BS}$ in the above formulas (2) and (3) is set to an average value or median value of the target ammonia concentration $NH3_{CONS\_TRGT}$ or an arbitrary value within the range of the target ammonia concentration $NH3_{CONS\_TRGT}$, for example.

In other words, this feedback controller 51 calculates the FB injection amount $G_{UREA\_FB}$ so that the detected ammonia concentration difference $DNH3_{CONS}$ matches the target ammonia concentration difference $DNH3_{CONS\_TRGT}$.

The adder 54 calculates the urea injection amount $G_{UREA}$ by way of adding the FB injection amount $G_{UREA\_FB}$ thus calculated and the reference injection amount $G_{UREA\_BS}$ as shown in the above formula (1), and inputs this to the exhaust purification device 2 as a control input value.

The adder 58 calculates a urea injection amount difference $DG_{UREA}$ by subtracting a reference injection amount $G_{UREA\_BS}$ from the urea injection amount $G_{UREA}$ thus calculated by the adder 54, a shown in the following formula (4), and inputs this to the predictor 511 of the feedback controller 51 and to the identifier 53.

$$DG_{UREA} = G_{UREA} - G_{UREA\_BS} \quad (4)$$

In the present embodiment, although a feedforward injection amount (hereinafter referred to as "FF injection amount") $G_{UREA\_FF}$ is used as this reference injection amount $G_{UREA\_BS}$ it is not limited thereto. The reference injection amount $G_{UREA\_BS}$ may be set to an arbitrary constant including "0", or a urea injection amount for maintaining the detected ammonia concentration $NH3_{CONS}$ to the aforementioned reference value $NH3_{CONS\_BS}$. Alternatively, the reference injection amount $G_{UREA\_BS}$ may be set to a learned value for maintaining the detected ammonia concentration $NH3_{CONS}$ to within a target ammonia slip range $RNH3_{CONS\_TRGT}$.

As explained in detail later, the target value correction portion 52 calculates a corrected target ammonia concentration $DNH3_{CONS\_TRGT\_MOD}$ by conducting a predetermined operation on the target ammonia concentration difference $DNH3_{CONS\_TRGT}$ in order to prevent overshoot and oscillatory behavior of the detected ammonia concentration difference $DNH3_{CONS}$ relative to the target ammonia concentration $DNH3_{CONS\_TRGT}$.

As explained in detail later, the identifier 53 identifies a plurality of model parameters a1, a2, b1 and b2 used by the predictor 511 of the feedback controller 51.

It should be noted that an operation is performed by the respective modules shown in FIG. 4 in different control cycles. In the present embodiment, the control cycles of the adders 54, 56, 57 and 58, i.e. the update period of the urea injection amount $G_{UREA}$, urea injection amount difference $DG_{UREA}$, detected ammonia concentration $NH3_{CONS}$, detected ammonia concentration difference $DNH3_{CONS}$, target ammonia concentration $NH3_{CONS\_TRGT}$ and target ammonia concentration difference $DNH3_{CONS\_TRGT}$ is defined as $\Delta Ti$. In addition, the control cycle of the identifier 53 is also defined as $\Delta Ti$. Therefore, the update period of the model parameters a1, a2, b1 and b2 are also $\Delta Ti$. It should be noted that, in the present embodiment, this update period $\Delta Ti$ is set on the order of 0.2 to 1.0 seconds, for example.

Hereinafter, the configuration of each module will be explained in detail.

Configuration of Target Value Correction Portion

The configuration of the target value correction portion 52 will be explained.

The target value correction portion 52 is configured to include a target value filter 521 and a target value correction unit 522, and calculates a corrected target ammonia concentration $DNH3_{CONS\_TRGT\_MOD}$ by the sequence shown in the following formulas (5) to (8).

The target value filter 521 is a so-called first-order time lag filter. In other words, the target value filter 521 calculates a virtual target value $DNH3_{CONS\_TRGT\_F}$ by performing the operations shown in the following formulas (5) and (6) with respect to the target ammonia concentration difference $DNH3_{CONS\_TRGT}(k)$ thus calculated.

$$DNH3_{CONS\_TRGT}(k+i)=DNH3_{CONS\_TRGT}(k) \quad (i=0\sim np) \tag{5}$$

$$DNH3_{CONS\_TRGT\_F}(k+i)=-POLE_F \\ DN3_{CONS\_TRGT\_F}(k+i-1)+(1+POLE_F) \\ DNH3_{CONS\_TRGT}(k+i) \quad (i=0\sim np) \tag{6}$$

Herein, the notation "k" is a notation indicating discretized time and, in the present embodiment, indicates being data detected or calculated every model sampling period $\Delta Tm$ described later. In other words, in a case of the notation "k" being data detected or calculated in a current control time, the notation "k−1", for example, indicates being data detected or calculated in a previous control time, i.e. at $\Delta Tm$ prior. It should be noted that the notation "k" is omitted as appropriate in the following explanation.

In addition, in the above formulas (5) and (6), $POLE_F$ is a tracking characteristic designating parameter for designating the tracking characteristic of the detected ammonia concentration difference $DNH3_{CONS}$ relative to the target ammonia concentration difference $DNHT3_{CONS\_TRGT}$ and $POLE_F$ set to be greater than −1 and less than 0. In addition, in the above formulas (5) and (6), np is a positive integer and indicates a prediction step number. The prediction step number np indicates the step number being predicted (step number for which $\Delta Tm$ is set as the control cycle) in the predictor 511, as explained later while referring to formula (17).

The target value correction unit 522 calculates the corrected target ammonia concentration $DNH3_{CONS\_TRGT\_MOD}$ according to the response delay characteristic of the detected ammonia concentration difference $DNH3_{CONS}$ as shown in the following formulas (7) and (8), in order to prevent overshoot and oscillatory behavior of the detected ammonia concentration $DNH3_{CONS}$ relative to the target ammonia concentration $DNH3_{CONS\_TRGT}$.

More specifically, this target value correction unit 522 first calculates deviation Ec between the detected ammonia concentration difference $DNH3_{CONS}$ and the virtual target value $DNH3_{CONS\_TRGT\_F}$ of the above formula (6), as shown in the following formula (7).

$$Ec(k)=DNH3_{CONS}(k)-DNH3_{CONS\_TRGT\_F}(k) \tag{7}$$

Next, as shown in the following formula (8), the corrected target ammonia concentration $DNH3_{CONS\_TRGT\_MOD}$ is calculated by adding a damping term that is proportional to the deviation Ec to the virtual target value $DNH3_{CONS\_TRGT\_F}$.

$$DNH3_{CONS\_TRGT\_MOD}(k+i)= \\ DNH3_{CONS\_TRGT\_F}(k)+(-POLE_E)^i Ec(k) \tag{8}$$

Herein, $POLE_E$, which is contained in the damping term of the above formula (8), is a deviation convergence characteristic designating parameter for designating the convergence characteristic of the deviation Ec, and $POLE_E$ is set to be greater than −1 and less than 0.

In the above way, the corrected target ammonia concentration $DNH3_{CONS\_TRGT\_MOD}$ is set between the target ammonia concentration difference $DNH3_{CONS\_TRGT}$ and the detected ammonia concentration difference $DNH3_{CONS}$, taking into account of the response delay characteristic of the detected ammonia concentration difference $DNH3_{CONS}$.

Herein, the corrected target ammonia concentration $DNH3_{CONS\_TRGT\_MOD}$ indicates a target value of a future time "k+1" relative to the present time "k", as shown in the above formula (8). Therefore, as explained later while referring to FIG. 6, this corrected target ammonia concentration $DNH3_{CONS\_TRGT\_MOD}(k+1)$ is more strictly set between a target ammonia concentration difference $DNH3_{CONS\_TRGT}(k+1)$ at a future time and a future predicted value of the detected ammonia concentration difference $DNH3_{CONS}$ (predicted ammonia concentration $PREDNH3_{EXS}(k+1)$ described later).

Configuration of Identifier

The configuration of the identifier 53 will be explained.

The identifier 53 identifies, by way of the recursive identification algorithms shown in the following formulas (9) to (15), the plurality of model parameters a1, a2, b1 and b2 of a plant model used by the predictor 511 described later. More specifically, a recursive identification algorithm is an algorithm that calculates a current control value $\theta(m)$ of a model parameter vector based on a latest control value $\zeta(m)$ of processing object data and a previous control value $\theta(m-1)$ of the model parameter vector.

$\theta(m)$ and $\zeta(m)$ are defined as four-component vectors as shown in the following formulas (9) and (10).

$$\theta^T(m)=[a1(m)a2(m)b1(m)b2(m)] \tag{9}$$

$$\xi^T(m)=[DNH3_{CONS}(m-Mmi)DNH3_{CONS}(m-2Mmi) \\ DG_{UREA}(m-Mmi)DG_{UREA}(m-2Mmi)] \tag{10}$$

Herein, the notation "m" is a notation indicating discretized time, and indicates being data detected or calculated every aforementioned control cycle $\Delta Ti$. In addition, this control cycle and model sampling period $\Delta Tm$ satisfy the following formula (11).

$$\Delta Tm=Mmi\Delta Ti \tag{11}$$

According to the recursive identification algorithm, the current control value $\theta(m)$ of the model parameter vector defining the model parameters a1, a2, b1 and b2 as components is calculated from the previous control value $\theta(m-1)$ by the following formula (12).

$$\theta(m)=\theta(m-1)+KP(m)ide(m) \tag{12}$$

Herein, ide(m) in the above formula (12) indicates the identification error defined by the following formula (13). KP(m) indicates a gain coefficient vector defined by the following formula (14). P(m) in the following formula (14) is a fourth-order square matrix defined by the following formula (15). In addition, in the following formula (15), I indicates a fourth-order unit matrix, and λ1 and λ2 respectively indicate weighting parameters.

$$ide(m) = \theta^T(m-1)\zeta(m) \tag{13}$$

$$KP(m) = \frac{P(m)\zeta(m)}{1+\zeta(m)^T P(m)\zeta(m)} \tag{14}$$

$$P(m+1) = \frac{1}{\lambda 1}\left\{1 - \frac{\lambda 2 P(m)\zeta(m)\zeta(m)^T}{\lambda 1 + \lambda 2\zeta(m)^T P(m)\zeta(m)}\right\} P(m) \tag{15}$$

Herein, various recursive identification algorithms can be selected as shown below, by setting the weighting parameters λ1 and λ2 of the above formula (15) as follows.

λ1=1, λ2=0: fixed gain algorithm
λ1=1, λ2=1: least-squares method algorithm
λ1=1, λ2=λ: gradual decrease gain algorithm (0<λ<1)
λ1=λ, λ2=1: weighted least-squared method algorithm (0<λ<1)

In addition, when calculating the model parameters a1, a2, b1 and b2 based on the above formulas (9) to (15), the values of these model parameters may gradually shift from the desired values. In this case, a constraint condition may be imposed on these model parameters. A specific example thereof will be explained later while referring to formulas (37) and (38).

By occasionally identifying the model parameters a1, a2, h1 and b2 by way of the identifier 53 in the above way, it is possible to prevent the control precision from declining, even in a case of modeling error arising in the plant model described later due to individual variation or degradation over time of the exhaust purification device.

Configuration of Feedback Controller

The configuration of the feedback controller 51 will be explained.

Figure 5:
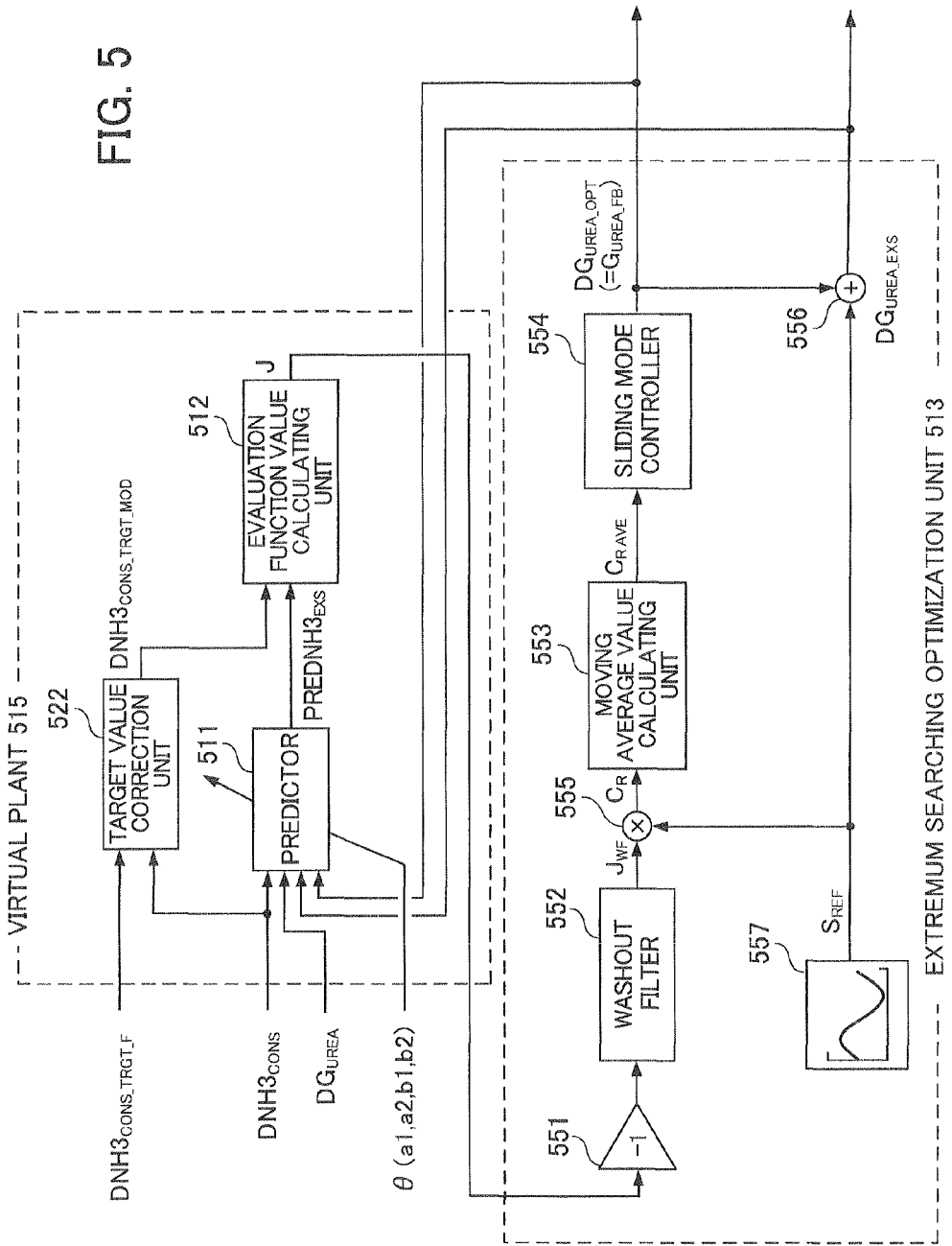
FIG. 5 is a block diagram showing a configuration of a feedback controller according to the embodiment.

FIG. 5 is a block diagram showing the configuration of the feedback controller 51.

The feedback controller 51 is configured to include the aforementioned target value correction unit 522 that calculates the corrected target ammonia concentration $DNH3_{CONS\_TRGT\_MOD}$, the predictor 511 that calculates the predicted ammonia concentration $PREDNH3_{EXS}$ as a future predicted value of the detected ammonia concentration difference $DNH3_{CONS}$, the evaluation function value calculating unit 512 that calculates an evaluation function value J based on this corrected target ammonia concentration $DNH3_{CONS\_TRGT\_MOD}$ and predicted ammonia concentration $PREDNH3_{EXS}$, and the extremum searching optimization unit 513 that calculates an optimum injection amount $DG_{UREA\_OPT}$ and search input $DG_{UREA\_EXS}$ such that the evaluation function value J thus calculated becomes an extremum, i.e. a minimum value.

In other words, in a case of regarding the target value correction unit 522, predictor 511 and evaluation function value calculating unit 512 as a virtual plant 515 as shown in FIG. 5, the extremum searching optimization unit 513 can be deemed a controller that calculates the optimum injection amount $DG_{UREA\_OPT}$ and search input $DG_{UREA\_EXS}$ so that the control output of this virtual plant 515, i.e. evaluation function value J, becomes a minimum value.

Herein, the predictor 511 and target value correction portion 52, which respectively calculate the predicted ammonia concentration $PREDNH3_{EXS}$ and corrected target ammonia concentration $DNH3_{CONS\_TRGT\_MOD}$ necessary in order to calculate the evaluation function value J, are also included in the virtual plant 515. In addition, the predicted ammonia concentration $PREDNH3_{EXS}$ changes depending on the model parameters a1, a2, b1 and b2, detected ammonia concentration difference $DNH3_{CONS}$ and urea injection amount difference $DG_{UREA}$, and the corrected target ammonia concentration $DNH3_{CONS\_TRGT\_MOD}$ also changes depending on the detected ammonia concentration difference $DNH3_{CONS}$ and virtual target value $DNH3_{CONS\_TRGT\_F}$. As a result, the detected ammonia concentration difference $DNH3_{CONS}$, virtual target value $DNH3_{CONS\_TRGT\_F}$, urea injection amount difference $DG_{UREA}$ and model parameters a1, a2, b1 and b2 can be deemed as schedule parameters of the virtual plant 515.

In addition, the extremum searching optimization unit 513 searches for a minimum value of the evaluation function value J using a periodic reference signal $S_{REF}$ as described in detail later. Then, the extremum searching optimization unit 513 inputs the optimum injection amount $DG_{UREA\_OPT}$ not containing the component of this reference signal $S_{REF}$ and a search input $DG_{UREA\_EXS}$ containing the component of the reference signal $S_{REF}$ to the predictor 511 of the aforementioned virtual plant 515. In addition, the optimum injection amount $DG_{UREA\_OPT}$, which does not contain the component of the reference signal $S_{REF}$, is the FB injection amount $G_{UREA\_FB}$.

Moreover, the control cycle of this feedback controller 51 is basically ΔTe, which is shorter than the update period ΔTi of the urea injection amount $G_{UREA}$. Therefore, the update period ΔTe of this optimum injection amount $DG_{UREA\_OPT}$ and search input $DG_{UREA\_EXS}$ is shorter than the update period ΔTi of the urea injection amount $G_{UREA}$. The details of this control cycle ΔTe will be described in detail later.

Hereinafter, the configurations of this predictor 511, evaluation function value calculating unit 512 and extremum searching optimization unit 513 will be explained in order.

Configuration of Predictor

The configuration of the predictor 511 will be explained.

The predictor 511 calculates the predicted ammonia concentration $PREDNH3_{EXS}$ based on the ammonia concentration difference $DG_{UREA}$, optimum injection amount $DG_{UREA\_OPT}$, search input $DG_{UREA\_EXS}$ containing the component of the reference signal $S_{REF}$, and the urea injection amount difference $DG_{UREA}$. In addition, when calculating the predicted ammonia concentration $PREDNH3_{EXS}$ this predictor 511 uses a model of the exhaust purification device (hereinafter referred to as "plant model") showing the dynamic characteristic of the detected ammonia concentration difference $DNH3_{CONS}$ from the urea injection amount difference $DG_{UREA}$.

Hereinafter, an optimum form of the plant model will be constructed while considering the problems thereof. It should be noted that this predictor 511 uses the plant model described later shown in formulas (27) to (35) as a final form.

First, as a plant model showing the dynamic characteristic of the detected ammonia concentration difference $DNH3_{CONS}$ from the urea injection amount difference $DG_{UREA}$, a model such as that shown in the following formula (16) is considered that contains a plurality of control output terms (terms proportional to the model parameters a1 and a2) proportional to the detected ammonia concentration difference $DNH3_{CONS}$ and a plurality of control input terms (terms proportional to the model parameters b1 and b2) proportional to the detected ammonia concentration difference $DNH3_{CONS}$.

$$DNH3_{CONS}(k+1) = a1DNH3_{CONS}(k) + \quad (16)$$
$$a2DNH3_{CONS}(k-1) + b1DG_{UREA}(k) + b2DG_{UREA}(k-1)$$

As described above, the notation "k" indicates being data detected or calculated every model sampling period ΔTm. In particular, this model sampling period ΔTm is preferably set to be longer than the aforementioned update period ΔTi of the urea injection amount $G_{UREA}$. The reason thereof will be explained.

With this predictor 511, the predicted ammonia concentration $PREDNH3_{EXS}$ is calculated from the current time until after a predetermined predicted time Tp, by way of recursively using the output of the plant model, as will be described in detail later. Herein, in a case of setting the prediction time Tp to a few to several tens of seconds, for example, if the model sampling period ΔTm is made a comparable level to ΔTi (approximately 0.2 to 1.0 seconds), the number of times recursively using the plant model will amount to on the order of several tens of times, the prediction error will accumulate due to modeling error, and the prediction accuracy will decline.

In addition, taking this point into account, the prediction time Tp and the model sampling period ΔTm are set so as to satisfy the following formula (17). In other words, the prediction time Tp is set so as to be equivalent to a few steps to a several tens of steps in a case of performing operations under the model sampling period ΔTm. In addition, herein, the step number corresponding to the prediction time Tp is defined as the prediction step number np in a case of performing operations under the model sampling period ΔTm, as shown in the following formula (17). In this case, the number of prediction steps np is set from 1 to tens of steps.

$$TP/\Delta Tm = np \quad (17)$$

In addition, in a case of defining the dead time of the plant model as d, it is unnecessary to consider the dead time of the model, and it is possible to perform stable control by setting the control cycle ΔTm to be larger than the dead time d. Therefore, the model sampling period ΔTm is preferably set as shown in the following formula (18).

$$\Delta Tm > d \quad (18)$$

More specifically, a time constant contained in the delay characteristic between the urea injection amount $G_{UREA}$ and the detected ammonia concentration $NH3_{CONS}$ of the exhaust purification device is several seconds to tens of seconds; whereas, the dead time is on the order to 1 to 2 seconds. Therefore, the model sampling period ΔTm is set to approximately 1.0 to 3.0 seconds, for example.

Next, the detected ammonia concentration differences $DNH3_{CONS}(k+1)$, $DNH3_{CONS}(k+2)$, ..., $DNH3_{CONS}(k+np)$ until after the prediction step number np are calculated as shown in the following formulas (20) to (24), by recursively using the output of the plant model shown in the above formula (16), i.e. left side of the above formula (16), in the control output term of the plant model during a subsequent step, and these are defined as predicted ammonia concentrations $PREDNH3_{CONS}(k+1)$, $PREDNH3_{CONS}(k+2)$, ..., $PREDNH3_{CONS}(k+np)$ at each time.

Herein, the future values of the urea injection amount difference $DG_{UREA}$ contained in the control input term of the plant model during a subsequent step are all set to values equal to the urea injection amount difference $DG_{UREA}(k)$, as shown in the following formula (19).

$$DG_{UREA}(k+1) = DG_{UREA}(k+2) = \ldots = DG_{UREA}(k+np-1) = DG_{UREA}(k) \quad (19)$$

Predicted ammonia concentration $PREDNH3_{CONS}(k+1)$ after 1—model sample time $$PREDNH3_{CONS}(k+1) = a1DNH3_{CONS}(k) + \quad (20)$$
$$a2DNH3_{CONS}(k-1) + b1DG_{UREA}(k) + b2DG_{UREA}(k-1)$$
$$(\cong DNH3_{CONS}(k+1))$$

Predicted ammonia concentration $PREDNH3_{CONS}(k+2)$ after 2—model sample times $$PREDNH3_{CONS}(k+2) = \quad (21)$$
$$a1DNH3_{CONS}(k+1) + a2DNH3_{CONS}(k) + b1DG_{UREA}(k+1) +$$
$$b2DG_{UREA}(k) = a1PREDNH3_{CONS}(k+1) +$$
$$a2DNH3_{CONS}(k) + b1DG_{UREA}(k) + b2DG_{UREA}(k)$$
$$(\cong DNH3_{CONS}(k+2))$$

Predicted ammonia concentration $PREDNH3_{CONS}(k+3)$ after 3—model sample times $$PREDNH3_{CONS}(k+3) = \quad (22)$$
$$a1DNH3_{CONS}(k+2) + a2DNH3_{CONS}(k+1) + b1DG_{UREA}(k+2) +$$
$$b2DG_{UREA}(k+1) = a1PREDNH3_{CONS}(k+2) +$$
$$PREDNH3_{CONS}(k+1) + b1DG_{UREA}(k) + b2DG_{UREA}(k)$$
$$(\cong DNH3_{CONS}(k+3))$$

Predicted ammonia concentration $PREDNH3_{CONS}(k+4)$ after 4—model sample times $$PREDNH3_{CONS}(k+4) = \quad (23)$$
$$a1DNH3_{CONS}(k+3) + a2DNH3_{CONS}(k+2) + b1DG_{UREA}(k+3) +$$
$$b2DG_{UREA}(k+4) = a1PREDNH3_{CONS}(k+3) +$$
$$PREDNH3_{CONS}(k+2) + b1DG_{UREA}(k) + b2DG_{UREA}(k)$$
$$(\cong DNH3_{CONS}(k+4))$$

predicted ammonia concentration $PREDNH3_{CONS}(k+np)$ after np—model sample times $$PREDNH3_{CONS}(k+np) = \quad (24)$$
$$a1DNH3_{CONS}(k+np-1) + a2DNH3_{CONS}(k+np-1) +$$
$$b1DG_{UREA}(k+np-2) + b2DG_{UREA}(k+np-2) =$$
$$a1PREDNH3_{CONS}(k+np-1) + PREDNH3_{CONS}(k+np-2) +$$
$$b1DG_{UREA}(k) + b2DG_{UREA}(k)$$
$$(\cong DNH3_{CONS}(k+np))$$

Next, the problems of the predicted ammonia concentrations $PREDNH3_{CONS}$ shown in the above formulas (20) to (24) derived in the above way will be considered.

In the aforementioned way, the extremum searching optimization unit 513 searches for the extremum of the evaluation function value J using the periodic reference signal $S_{REF}$. However, the component of the reference signal $S_{REF}$ is not included in the above formulas (20) to (24). As a result, the correlation between the evaluation function value J and the reference signal $S_{REF}$ cannot be determined, since the influence of the reference signal $S_{REF}$ is not reflected in the evaluation function value J that is calculated based on such a predicted ammonia concentration $PREDNH3_{CONS}$. Therefore, the above formulas (20) to (24) are preferably changed so that the component of the reference signal $S_{REF}$ is included therein.

In addition, the model sampling period $\Delta Tm$ is preferably set to be longer than the update period $\Delta Ti$ of the urea injection amount $G_{UREA}$, as described above. However, when searching for a minimum value of the evaluation function value J, and calculating the optimum injection amount $DG_{UREA\_OPT}$ and search input $DG_{UREA\_EXS}$ by way of the extremum searching optimization unit 513, this optimum injection amount $DG_{UREA\_OPT}$ and search input $DG_{UREA\_EXS}$ preferably sufficiently converge within the update period $\Delta Ti$ of the urea injection amount $G_{UREA}$. As a result, it is necessary to change the above formulas (20) to (24) derived in the model sampling period $\Delta Tm$ to be under the update period $\Delta Te$, which is shorter than the update period $\Delta Ti$ of the urea injection amount $G_{UREA}$.

Herein, these update periods $\Delta Ti$ and $\Delta Te$ and the model sampling period $\Delta Tm$ are periods satisfying the following formulas (25) and (26). More specifically, the update period $\Delta Te$ is set to approximately 0.1 to 0.5 seconds, for example, in a case of the update period $\Delta Ti$ being set to approximately 0.2 to 1.0 seconds, as explained above.

$$\Delta Ti = Mie \Delta Te \quad (25)$$

$$\Delta Tm = Mmi \Delta Ti = MmiMie \Delta Te \quad (26)$$

Taking the above such two problems into account, the above formulas (20) to (24) are changed as shown in the following formulas (27) to (35).

Predicted ammonia concentration $PREDNH3_{EXS}$ (n+MmiMie) after 1—model sample time $$PREDNH3_{EXS}(n + MmiMie) = \quad (27)$$
$$a1(n, k-1)DNH3_{CONS}(n, k) + a2(n, k-1)DNH3_{CONS}$$
$$(n - MmiMie, k) + b1(n, k-1)DG_{UREA\_EXS}(n) +$$
$$b2(n, k-1)DG_{UREA}(n, k-1) \cong PREDNH3_{CONS}(k+1)$$

Predicted ammonia concentration $PREDNH3_{EXS}$ (n+2MmiMie) after 2—model sample times $$PREDNH3_{CNT}(n + MmiMie) = \quad (28)$$
$$a1(n, k-1)DNH3_{CONS}(n, k) + a2(n, k-1)DNH3_{CONS}$$
$$(n - MmiMie, k) + b1(n, k-1)DG_{UREA\_OPT}(n) +$$
$$b2(n, k-1)DG_{UREA}(n, k-1) \cong PREDNH3_{CONS}(k+1)$$

-continued $$PREDNH3_{EXS}(n + 2MmiMie) = \quad (29)$$
$$a1(n, k-1)PREDNH3_{CONS}(n + MmiMie) +$$
$$a2(n, k-1)DNH3_{CONS}(n, k) + b1(n, k-1)DG_{UREA\_EXS}(n) +$$
$$b2(n, k-1)DG_{UREA\_OPT}(n) \cong PREDNH3_{CONS}(k+2)$$

Predicted ammonia concentration $PREDNH3_{EXS}$ (n+3MmiMie) after 3—model sample times $$PREDNH3_{CNT}(n + 2MmiMie) = \quad (30)$$
$$a1(n, k-1)PREDNH3_{CNT}(n + MmiMie) +$$
$$a2(n, k-1)DNH3_{CONS}(n, k) + b1(n, k-1)DG_{UREA\_OPT}(n) +$$
$$b2(n, k-1)DG_{UREA\_OPT}(n) \cong PREDNH3_{CONS}(k+2)$$

$$PREDNH3_{EXS}(n + 3MmiMie) = \quad (31)$$
$$a1(n, k-1)PREDNH3_{CNT}(n + 2MmiMie) + a2(n, k-1)PREDNH$$
$$3_{CONS}(n + MmiMie) + b1(n, k-1)DG_{UREA\_EXS}(n) +$$
$$b2(n, k-1)DG_{UREA\_OPT}(n) \cong PREDNH3_{CONS}(k+3)$$

Predicted ammonia concentration $PREDNH3_{EXS}$ (n+4MmiMie) after 4—model sample times $$PREDNH3_{EXS}(n + 3MmiMie) = \quad (32)$$
$$a1(n, k-1)PREDNH3_{CNT}(n + 2MmiMie) + a2(n, k-1)PREDNH$$
$$3_{CNT}(n + MmiMie) + b1(n, k-1)DG_{UREA\_OPT}(n) +$$
$$b2(n, k-1)DG_{UREA\_OPT}(n) \cong PREDNH3_{CONS}(k+3)$$

$$PREDNH3_{EXS}(n + 4MmiMie) = \quad (33)$$
$$a1(n, k-1)PREDNH3_{CNT}(n + 3MmiMie) + a2(n, k-1)PREDNH$$
$$3_{CNT}(n + 2MmiMie) + b1(n, k-1)DG_{UREA\_EXS}(n) +$$
$$b2(n, k-1)DG_{UREA\_OPT}(n) \cong PREDNH3_{CONS}(k+4)$$

Predicted ammonia concentration $PREDNH3_{EXS}$ (n+npMmiMie) after np—model sample time $$PREDNH3_{EXS}(n + (np-1)MmiMie) = \quad (34)$$
$$a1(n, k-1)PREDNH3_{CNT}(n + (np-2)MmiMie) +$$
$$a2(n, k-1)PREDNH3_{CNT}(n + (np-3)MmiMie) +$$
$$b1(n, k-1)DG_{UREA\_OPT}(n) + b2(n, k-1)DG_{UREA\_OPT}(n) \cong$$
$$PREDNH3_{CONS}(k + np - 1)$$

$$PREDNH3_{EXS}(n + npMmiMie) = \quad (35)$$
$$a1(n, k-1)PREDNH3_{CNT}(n + (np-1)MmiMie) +$$
$$a2(n, k-1)PREDNH3_{CNT}(n + (np-2)MmiMie) +$$
$$b1(n, k-1)DG_{UREA\_EXS}(n) + b2(n, k-1)DG_{UREA\_OPT}(n) \cong$$
$$PREDNH3_{CONS}(k + np)$$

Herein, the notation "n" is a notation indicating discretized time, and indicates being data detected or calculated every aforementioned control cycle $\Delta Te$.

In the above formulas (27) to (35), the model parameters $a1(n,k)$, $a2(n,k)$, $b1(n,k)$ and $b2(n,k)$, urea injection amount difference $DG_{UREA}(m,k)$, and detected ammonia concentration $DNH3_{CONS}(n, k)$ respectively indicate parameters updated at the period $\Delta Ti$ as explained above, and over sampled at the shorter time period $\Delta Te$.

In addition, the value of a previous control time, i.e. (k−1), is used in the model parameters and the urea injection amount difference $DG_{UREA}$, as shown in the above formula (27).

Since the update period of the model parameters and $DG_{UREA}$ is $\Delta Ti$, if the urea injection amount difference $DG_{UREA}$ is calculated after the operation of the identifier, the value of the previous control time (k−1) will basically be used in these model parameters and urea injection amount difference $DG_{UREA}$. Herein, if the operation of the identifier is performed immediately after the operation of the urea injection amount difference, for example, the value of the current control time (k) will be used in the model parameters, and the value of the previous control time (k−1) will be used in the urea injection amount difference $DG_{UREA}$.

Characteristics of the above formulas (27) to (35) will be explained herein.

As shown in the above formulas (27), (29), (31), (33) and (35), the search input $DG_{UREA\_EXS}$ containing the reference signal is used only in a portion of the plurality of control input terms (terms proportional to b1 and b2). More specifically, among the two control input terms proportional to b1 and b2, the search input $DG_{UREA\_EXS}$ is only used in the term proportional to b1.

As shown in the above formulas (27) to (35), in the predicted ammonia concentration $PREDNH3_{EXS}$ of a certain time, the predicted ammonia concentration $PREDNH3_{EXS}$ one prior to the model sample time of this time is used. As a result, if the search input $DG_{UREA\_EXS}$ containing the reference signal were used in the term proportional to b2, the influence of the search input $DG_{UREA\_EXS}$ containing the reference signal would be redundant between the term proportional to b1 and the term proportional to b2, and it would become difficult to determine the correlation between the reference signal and the evaluation function value. Therefore, the convergence property of the detected ammonia concentration $NH3_{CONS}$ to the target ammonia concentration $NH3_{CONS\_TRGT}$ may decline as a result. In the present embodiment, the search input $DG_{UREA\_EXS}$ is only used in the term proportional to b1 as explained above in order to prevent such a decline in the convergence property.

In addition, as shown in the above formulas (27), (29), (31), (33) and (35), among the predicted ammonia concentrations $PREDNH3_{EXS}$ of certain times, a predicted ammonia concentration $PREDNH3_{CNT}$ of one model sample time prior is recursively used in the control output terms (terms proportional to a1 and a2). Herein, as shown in the above formulas (28), (30), (32) and (34), for these predicted ammonia concentrations $PREDNH3_{CNT}$ of one model sample time prior recursively substituted, the optimum injection amount $DG_{UREA\_OPT}$ not containing the reference signal is used in the control input terms (terms proportional to b1 and b2).

Herein, if the search input $DG_{UREA\_EXS}$ were used in such predicted ammonia concentrations $PREDNH3_{CNT}$ of one model sample time prior, the influence of the reference signal would accumulate as the prediction time progresses and the control system would easily become oscillatory, a result of which the convergence property of the detected ammonia concentration $NH3_{CONS}$ relative to the target ammonia concentration $NH3_{CONS\_TRGT}$ may decline.

In addition, even if such oscillation did not occur, if the prediction time were changed, for example, the severity of the reference signal on the evaluation function value J may change greatly. In such a case, the gain of the controller also must be reset, and a problem arises in that setting of the parameters becomes complex. In order to avoid the above such problem in the present embodiment, only the optimum injection amount $DG_{UREA\_OPT}$ not containing the reference signal is used in such predicted ammonia concentrations $PREDNH3_{CNT}$ of one model sample time prior recursively substituted.

Furthermore, as explained above, if the dynamic characteristic of the predicted ammonia concentration of each model sample time is unstable due to the predicted ammonia concentration of each model sample time being recursively used in the control output terms (terms proportional to a1 and a2) of a subsequent model sample time in the above formulas (27) to (35), the predicted ammonia concentration may diverge. Consequently, when identifying the model parameters a1 and a2 by way of the identifier 53, these model parameters a1 and a2 are identified under constraint conditions such as those shown in the following formulas (37) and (38).

$$|a1(n,k-1)|+a2(n,k-1)<1 \tag{37}$$

$$a2(n,k-1)>-1 \text{ or } |a1(n,k-1)|<-2 \tag{38}$$

Configuration of Evaluation Function Value Calculating Unit

The configuration of the evaluation function value calculating unit 512 will be explained. The evaluation function value calculating unit 512 calculates the evaluation function value J such as that shown in the following formula (39), based on the square sums of deviation between the predicted ammonia concentration $PREDNH3_{EXS}$ calculated by the predictor 511 and the corrected target ammonia concentration $DNH3_{CONS\_TRGT\_MOD}$ calculated by the target value correction unit 522.

$$J(n) = \sum_{i=1}^{np}(PRENH3_{EXS}(n+MmiMiei) - DNH3_{CONS\_TRGT\_MOD}(k+i))^2 \tag{39}$$

Figure 6:
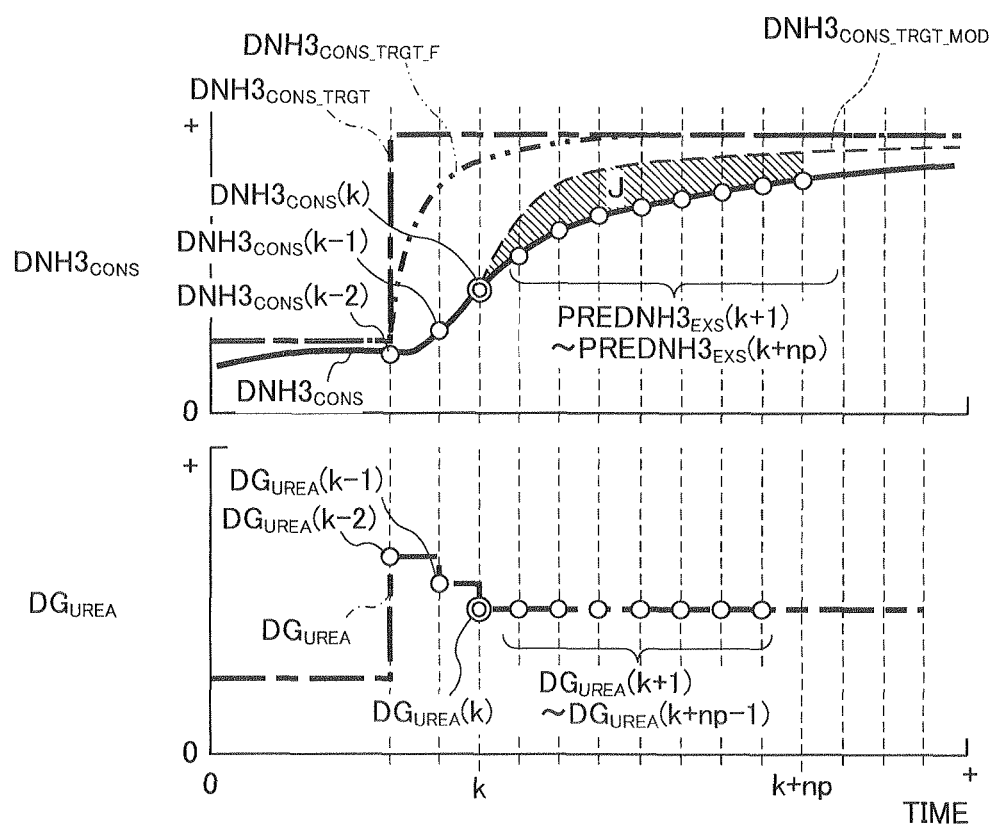
FIG. 6 presents graphs showing a relationship between an evaluation function value and an urea injection amount difference according to the embodiment.

FIG. 6 presents graphs showing a relationship between the evaluation function value J and the urea injection amount difference $DG_{UREA}$.

In FIG. 6, the top graph shows the relationship between the ammonia concentration and time, and the bottom graph shows the relationship between the urea injection amount and time. FIG. 6 shows a case in which predicted ammonia concentrations $PREDNH3_{EXS}(k+1)$ to $PREDNH3_{EXS}(k+np)$ on and after the present time are calculated based on the detected ammonia concentration $DNH3_{CONS}$ and urea injection amount difference $DG_{UREA}$ until the present time, with the time k shown by the double circle as the present time.

As shown in FIG. 6, the virtual target value $DNH3_{CONS\_TRGT\_F}$ shows a first order lag in response to the target ammonia concentration difference $DNH3_{CONS\_TRGT}$ set step-wise. Furthermore, as explained above, the corrected target ammonia concentration $DNH3_{CONS\_TRGT\_MOD}(k+i)$ is set between the predicted ammonia concentration $PREDNH_{EXS}(k+i)$, which is a future predicted value of the detected ammonia concentration difference $DNH3_{CONS}$ shown by a solid line, and the target ammonia concentration difference $DNH3_{CONS\_TRGT}(k+i)$.

Herein, the predicted ammonia concentrations $PREDNH3_{EXS}(k+1)$ to $PREDNH3_{EXS}(k+np)$ are calculated under conditions in which the urea injection amount differences $DG_{UREA}(k+1)$ to $DG_{UREA}(k+np-1)$ at this time and after are made constant, as shown in the above formula (19).

In addition, the evaluation function value J becomes the square sum of the deviation between these predicted ammonia concentration $PREDNH3_{EXS}$ and corrected target ammonia concentrations $DNH3_{CONS\_TRGT\_MOD}$, as shown in the above formula (39). Therefore, by determining the urea injection amount difference $DG_{UREA}(k)$ so as to make such an evaluation function value J a minimum, the urea injection amount difference $DG_{UREA}$ can be determined so that the region indicated in hatching in FIG. 6 becomes narrower, i.e. the detected ammonia concentration difference $DNH3_{CONS}$ quickly matches the target ammonia concentration difference $DNH3_{CONS\_TRGT}$.

Referring back to FIG. 5, although the evaluation function value J is defined by the above formula (39) in the present embodiment, this definition for the evaluation function value J may be altered as appropriate depending on the use.

More specifically, in a case of the prediction time extending to reduce the computational load, for example, it may be defined by thinning the square sum of deviation by a predetermined interval, as shown in the following formula (40). Herein, the constant q is an integer specifying the thinning interval, and is set as the denominator of the number of prediction steps np.

$$J(n) = \sum_{i=1}^{np/q} (PRENH3_{EXS}(n + MmiMieqi) - DNH3_{CONS\_TRGT\_MOD}(k + qi))^2 \quad (40)$$

Alternatively, in a case of further reducing the computational load, for example, it may be defined by the square of deviation after the prediction step number np, as shown in the following formula (41).

$$J(n) = (PRENH3_{EXS}(n+MmiMienp) - DNH3_{CONS\_TRGT\_MOD}(k+np))^2 \quad (41)$$

Configuration of Extremum Searching Optimization Unit

The configuration of the extremum searching optimization unit 513 will be explained.

The extremum searching optimization unit 513 is configured to include an amplifier 551, a washout filter 552, a moving average value calculating unit 553, a sliding mode controller 554, a multiplier 555, an adder 556, and a reference signal output unit 557.

This extremum searching optimization unit 513 calculates the optimum injection amount $DG_{UREA\_OPT}$ and the search input $DG_{UREA\_EXS}$ according to the sequence shown in the below formulas (42) to (51), so that the evaluation function value J thus calculated becomes a minimum.

The amplifier 551 inverts the sign of the evaluation function value J by multiplying the evaluation function value J thus calculated by the evaluation function value calculating unit 512 by "−1" and redefines this as evaluation function value J', as shown in the below formula (42). In other words, for convenience of operation, this extremum searching optimization unit 513 searches for the maximum value of the evaluation function value J' instead of searching for the minimum value of the evaluation function value J.

$$J'(n) = -J(n) \quad (42)$$

The washout filter 552 calculates a high-pass filtering value $J_{WF}$ of this evaluation function value J' by conducting simplified filter processing, such as that shown in the below formula (43), on the evaluation function value J'. It should be noted that the passband of the filter in this filter processing is set so as to include the frequency $F_{REF}$ of the reference signal $S_{REF}$ (refer to formula (45) described later).

$$J_{WF}(n) = 0.5J'(n) - 0.5J'(n-1) \quad (43)$$

The multiplier 555 multiplies the reference signal $S_{REF}$ output from the reference signal output unit 557 by the high-pass filtering value $J_{WF}$ of the evaluation function value J' to calculate the product $C_R$, as shown in the following formula (44).

$$C_R(n) = J_{WF}(n) S_{REF}(n) \quad (44)$$

Herein, the reference signal output unit 557 outputs a sine wave of amplitude $A_{REF}$ and frequency $F_{REF}$, such as that shown in the following formula (45), as the reference signal $S_{REF}$. It should be noted that the reference signal is not limited to such a sine wave, and may adopt any periodic function such as a triangle wave, trapezoid wave, and synthetic wave.

$$S_{REF}(n) = A_{REF} \sin(2\pi F_{REF} n \Delta Te) \quad (45)$$

The moving average value calculating unit 553 calculates the moving average value $C_{R\_AVE}$ of the product $C_R$, as shown in the following formula (46). Herein, $N_{AVE}$ is the moving average tap number.

$$C_{R\_AVE}(n) = \sum_{i=0}^{Nave} C_R(n-i) \quad (46)$$

Figure 7:
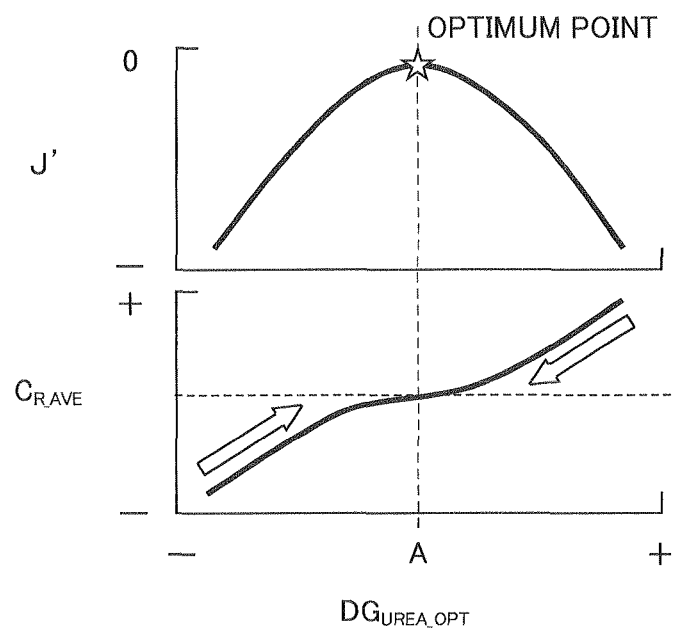
FIG. 7 presents graphs showing a correlation between the evaluation function value and a moving average value relative to the optimum injection amount according to the embodiment.

FIG. 7 presents graphs showing a correlation between the evaluation function value J' and the moving average value $C_{R\_AVE}$ relative to the optimum injection amount $DG_{UREA\_OPT}$. More specifically, FIG. 7 presents graphs showing the change in the evaluation function value J' and the moving average value $C_{R\_AVE}$ when causing the optimum injection amount $DG_{UREA\_OPT}$ to change.

As shown in FIG. 7, the moving average value $C_{R\_AVE}$ becomes "0" with the optimum injection amount $DG_{UREA\_OPT}$ shown by the star at which the evaluation function value J' is a maximum. In addition, the moving average value $C_{R\_AVE}$ is a monotone increasing function relative to the optimum injection amount $DG_{UREA\_OPT}$.

Based on this fact, the extremum searching optimization unit 513 uses the moving average value $C_{R\_AVE}$ shown in the above formula (46) as a correlation function, and determines the optimum injection amount $DG_{UREA\_OPT}$ such that this moving average value $C_{R\_AVE}$ becomes "0".

Referring back to FIG. 5, the moving average tap number $N_{AVE}$ of the above formula (46) is defined by the following formula (47). Herein, supposing j is an integer, the time interval of the moving average segment, i.e. $N_{AVE}\Delta Te$, of the moving average value $C_{R\_AVE}$ becomes the integer j times the period of the reference signal $S_{REF}$.

$$N_{AVE} = j \frac{1}{F_{REF} \Delta Te} \quad (47)$$

As shown in FIG. 5, a loop in which a periodic signal containing the reference signal $S_{REF}$ recurs is formed between the virtual plant 515 and the extremum searching optimization unit 513. When such a periodic reference signal $S_{REF}$ recurs, the parameters in this loop become oscillatory, and these parameters may diverge in the worst case.

Consequently, in the present embodiment, by defining the moving average tap number $N_{AVE}$ as shown in the above formula (47), the periodic component of the reference signal $S_{REF}$ is eliminated from the moving average value $C_{R\_AVE}$, and the periodic component of the reference signal $S_{REF}$ is prevented from recurring in the aforementioned loop. In this way, the maximum value of the evaluation function value J' can be stably searched.

The sliding mode controller 554 calculates the optimum injection amount $DG_{UREA\_OPT}$ such that the moving average value $C_{R\_AVE}$ becomes "0", based on an algorithm of sliding mode control. Herein, sliding mode control is an extension of so-called response-adaptive control that enables designation of a convergence rate of a controlled amount, and is control that enables the following rate of the controlled amount to the target value and the convergence rate of the controlled amount in a case of noise having been applied to be individually designated. More specifically, it calculates the optimum injection amount $DG_{UREA\_OPT}$ based on the following formulas (48) to (51).

$$DG_{UREA\_OPT}(n) = DG_{UREA\_RCH}(n) + DG_{UREA\_ADP}(n) \quad (48)$$

$$DG_{UREA\_RCH}(n) = K_{RCH}\sigma(n) \quad (49)$$

$$DG_{UREA\_ADP}(n) = K_{ADP}\sum_{i=1}^{n}\sigma(i) \quad (50)$$

$$\sigma(n) = C_{R\_AVE}(n) + SC_{R\_AVE}(n-1) \quad (51)$$

As shown in the above formula (48), the optimum injection amount $DG_{UREA\_OPT}$ is calculated from the sum of the reaching-law input $DG_{UREA\_RCH}$ shown in the above formula (49) and the adaptive-law input $DG_{UREA\_APP}$ shown in the above formula (50).

The reaching-law input $DG_{UREA\_RCH}$ is an input for placing the moving average value $C_{R\_AVE}$ on a switching line described later, and is calculated by multiplying a predetermined reaching-law control gain $K_{RCH}$ by a switching function o shown in the above formula (51)

The adaptive-law input $DG_{UREA\_ADP}$ is an input for suppressing the influence of modeling error and noise and places the moving average value $C_{R\_AVE}$ on the switching line described later, and is calculated by multiplying a predetermined adaptive-law control gain $K_{ADP}$ by the value of an integral of the switching function σ.

The switching function σ is calculated by the sum of the moving average value $C_{R\_AVE}(n)$ of the current control time and the product of multiplying a predetermined switching function setting parameter S by the moving average value $C_{R\_AVE}(n-1)$ of the previous control time, as shown in the above formula (51).

Herein, the relationship between the switching function setting parameter S and the convergence rate of $C_{R\_AVE}$ will be explained.

As shown in the above formula (51), the combination of the moving average value $C_{R\_AVE}(n)$ and $C_{R\_AVE(n-1)}$ satisfying the switching function σ(n)=0 within a phase plane defining the horizontal axis as the moving average value $C_{R\_AVE}(n-1)$ of the previous control time and the vertical axis as the moving average value $C_{R\_AVE}(n)$ of the current control time is a straight line with a slope of −S. In particular, this straight line is called the switching line. In addition, on this switching line, since $C_{R\_AVE}(n-1) > C_{R\_AVE}(n)$ by setting −S to a value larger than 0 and less than 1, the moving average value $C_{R\_AVE}(n)$ converges to 0. The sliding mode control is control focused on the behavior of the moving average value $C_{R\_AVE}(n)$ on this switching line.

In other words, by performing control so that the combination of the moving average value $C_{R\_AVE}(n)$ of the current control time and the moving average value $C_{R\_AVE}(n-1)$ of the previous control time falls on this switching line, control that is robust against noise and modeling error is realized, and the moving average value $C_{R\_AVE}$ can be made to converge to "0" while suppressing overshoot and oscillatory behavior.

In particular, since the evaluation function value J changes depending on the detected ammonia concentration difference $DNH3_{CONS}$ and the virtual target value $DNH3_{CONS\_TRGT\_F}$, the change thereof during a transition becomes large, a result of which the moving average value $C_{R\_AVE}$ easily displays oscillatory behavior. By using sliding mode control in such a system, oscillation occurring in the moving average value $C_{R\_AVE}$ can be effectively suppressed.

It should be noted that, although the optimum injection amount $DG_{UREA\_OPT}$ has been calculated so that the moving average value $C_{R\_AVE}$ converges to "0" by way of an algorithm of sliding mode control in the present embodiment, it is not limited thereto, and PID control may be used. However, if using PID control, the moving average value $C_{R\_AVE}$ will easily display oscillatory behavior compared to a case of using sliding mode control. Therefore, the case of using PID control requires establishing so that the oscillatory behavior of the moving average value $C_{R\_AVE}$ is within an acceptable range.

In addition, the optimum injection amount $DG_{UREA\_OPT}$ calculated in the above way is output as the FB injection amount $G_{UREA\_FB}$ of the feedback controller 51.

The adder 556 calculates the search input $DG_{UREA\_EXS}$ by adding the reference signal $S_{REF}$ to the optimum injection amount $DG_{UREA\_OPT}$ not containing the component of the reference signal $S_{REF}$, as shown in the following formula (52).

$$DG_{UREA\_EXS}(n) = DG_{UREA\_OPT}(n) + S_{REF}(n) \quad (52)$$

With the extremum searching optimization unit 513 configured in the above way, the update period ΔTe of the optimum injection amount $DG_{UREA\_OPT}$ and the search input $DG_{UREA\_EXS}$ is made shorter than the update period ΔTi of the urea injection amount $G_{UREA}$. With this, oscillations when optimizing the optimum injection amount $DG_{UREA\_OPT}$ and the search input $DG_{UREA\_EXS}$ by the extremum searching optimization unit 513 can be prevented from appearing as oscillations of the urea injection amount $G_{UREA}$ actually input to the exhaust purification device 2. Therefore, it is possible to stably control the exhaust purification device 2.

Control using the extremum searching optimization unit 513 of the present embodiment configured in the above way and control using a conventional extremum searching optimization unit will be compared.

Figure 8:
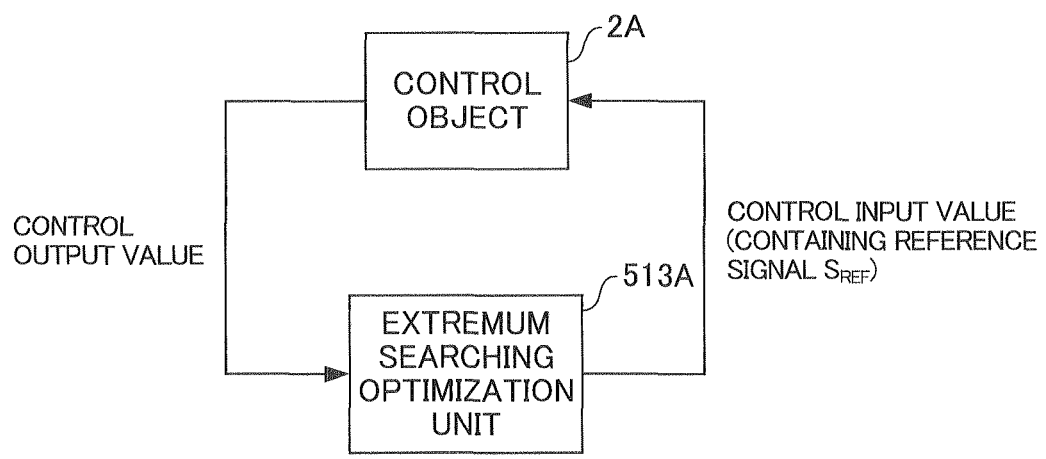
FIG. 8 is a block diagram showing a configuration between a conventional extremum searching optimization unit and a control object.

FIG. 8 is a block diagram showing a configuration between a conventional extremum searching optimization unit 513A and a control object 2A.

The conventional extremum searching optimization unit 513A inputs a control input value containing the component of the periodic reference signal $S_{REF}$ to a direct control object. Furthermore, optimization of the control input value is performed based on the control output value as a response to the input containing this reference signal $S_{REF}$ so that the control input value excluding the reference signal $S_{REF}$ matches a predetermined target value.

On the other hand, the extremum searching optimization unit 513 of the present embodiment optimizes the control input value $DG_{UREA\_OPT}$ so as to minimize the evaluation function value J. As a result, it differs from the aforementioned conventional extremum searching optimization unit 513A in that it does not directly input the search input $DG_{UREA\_EXS}$ containing the reference signal $S_{REF}$ to the exhaust purification device (refer to FIG. 4) as a control object, but rather sets up the virtual plant 515 and inputs to this virtual plant 515, as shown in FIG. 5. Furthermore, it optimizes the control input values $DG_{UREA\_OPT}$ and $DG_{UREA\_EXS}$ so that the output J of this virtual plant becomes a minimum. This point differs greatly from the case of using the conventional extremum searching optimization unit 513A.

Referring back to FIG. 4, the reference injection amount $G_{UREA\_BS}$ will be explained in detail next.

In the present embodiment, the FF injection amount $G_{UREA\_FF}$ is used as the reference injection amount $G_{UREA\_BS}$. This FF injection amount $G_{UREA\_FF}$ is a control input value for controlling so that the NOx reduction rate of the selective reduction catalyst maintains the maximum value, and is determined based on the amount of NOx in the exhaust, which changes according to the operating state of the engine.

More specifically, this FF injection amount $G_{UREA\_FF}$ is calculated based on the output value of the NOx sensor 28 (refer to FIG. 1), i.e. detected NOx concentration $NOX_{CONS}$, as shown in the following formulas (53) and (54).

$$G_{UREA\_FF}(m) = K_{NOX\_NH3} NOX_{CONS}(m-\delta1) G_{EX}(m-\delta2) \quad (53)$$

$$G_{EX}(m) = K_{FUEL\_EX} G_{FUEL}(m) NE(m)/60 \quad (54)$$

Herein, $\delta1$ in the above formulas (53) and (54) indicates the time until the exhaust reaches the selective reduction catalyst from the detection portion of the NOx sensor. In addition, $\delta2$ indicates the time until the exhaust reaches the selective reduction catalyst from the engine. $G_{EX}$ indicates an estimated value for the volume of exhaust. $K_{NOX\_NH3}$ indicates a coefficient for calculating the urea injection amount necessary for reducing NOx. $K_{FUEL\_EX}$ indicates a coefficient for converting from fuel injection amount to volume of exhaust. NE indicates the revolution speed of the engine.

It should be noted that, in a case of not using the output value of the NOx sensor, the FF injection amount $G_{UREA\_FF}$ is determined from a map search, based on the revolution speed NE of the engine and a load parameter TRQ representing the load of the engine as the operating state of the engine, for example.

Figure 9:
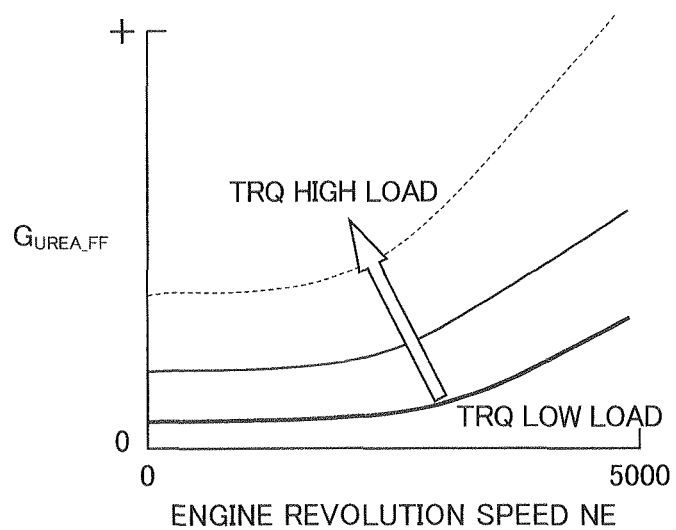
FIG. 9 is a graph showing an example of a control map for determining a FF injection amount according to the embodiment.

FIG. 9 is a graph showing an example of a control map for determining the FF injection amount $G_{UREA\_FF}$.

As shown in FIG. 9, in the control map, the FF injection amount $G_{UREA\_FF}$ is determined to be a larger value accompanying the revolution speed NE of the engine or the load parameter TRQ increasing.

This is because, with a larger load parameter TRQ of the engine, the NOx emission amount increases from the combustion temperature of the air-fuel mixture rising, and with a higher revolution speed NE of the engine, the NOx emission amount per unit time increases.

Although the FF injection amount $G_{UREA\_FF}$ determined in the aforementioned way has been used as the reference injection amount $G_{UREA\_BS}$ in the present embodiment, it is not limited thereto. For example, as shown in the following formulas (55) to (57), the reference injection amount $G_{UREA\_BS}$ may be determined so as to be adapted to degradation and variation in the selective reduction catalysts and variation in the NOx emission characteristics of engines.

$$G_{UREA\_BS}(m) = G_{UREA\_BS\_INI} + DG_{UREA\_BS}(m) \quad (55)$$

$$DG_{UREA\_BS}(m) = KP_{BS} E_{BS}(m) + KI_{BS} \sum_{i=0}^{m} E_{BS}(i) \quad (56)$$

$$E_{BS}(m) = \begin{cases} -DG_{UREA\_FB}(m) \\ \text{or} \\ DNH3_{CONS}(m) - DNH3_{CONS\_TRGT\_F}(m) \end{cases} \quad (57)$$

Herein, the $G_{UREA\_BS\_INI}$ in the above formulas (55) to (57) indicates the initial value of $G_{UREA\_BS}$. $KP_{BS}$ and $KI_{BS}$ respectively indicate adaptive gains. $DG_{UREA\_FB}$ indicates the down sampling value by the period $\Delta Ti$ of $DG_{UREA\_OPT}$, which is updated at the period $\Delta Te$.

Next, urea injection control processing executed by the ECU will be explained while referring to FIG. 10.

Figure 10:
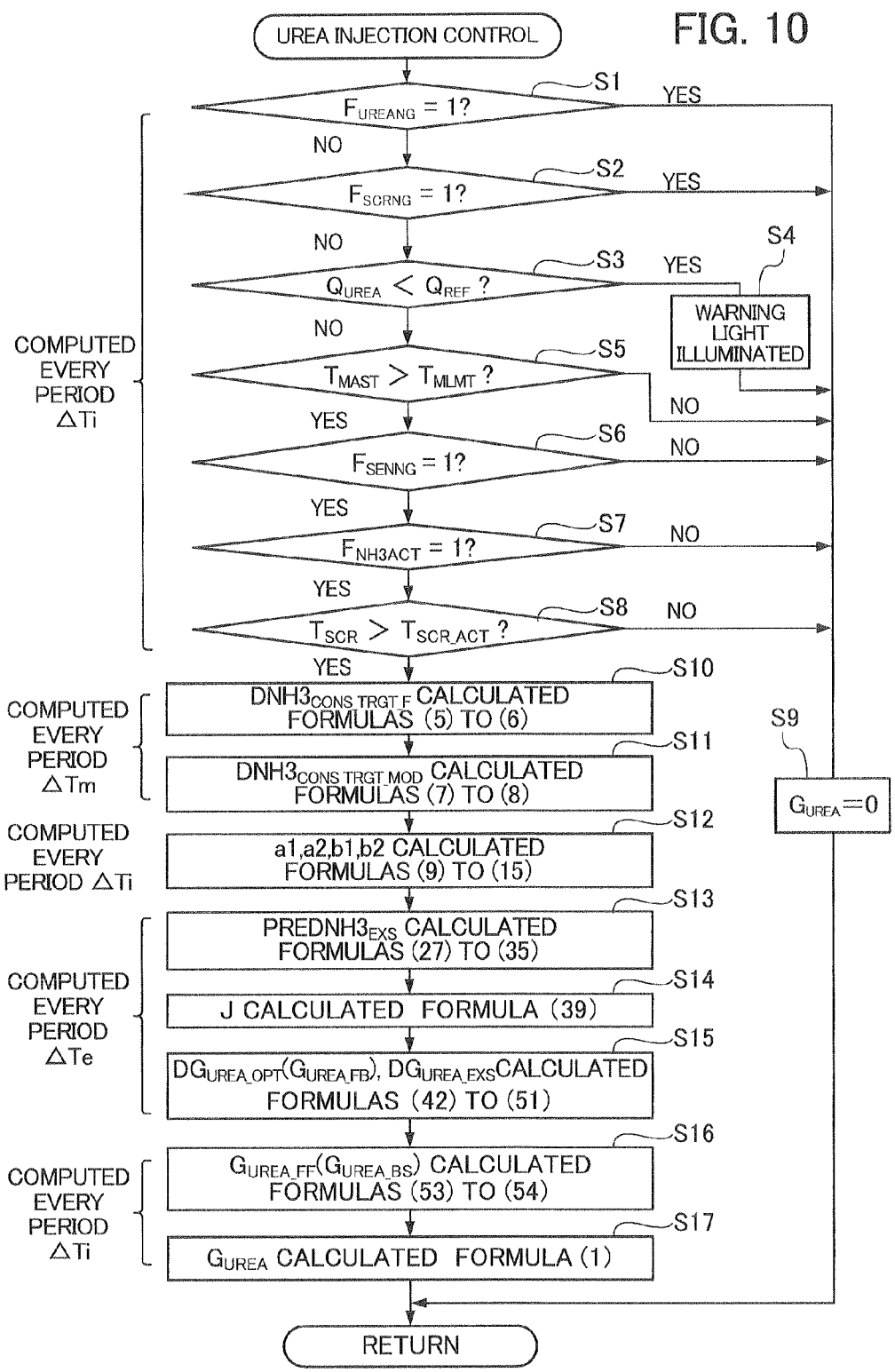
FIG. 10 is a flowchart showing a sequence of urea injection control processing executed by the ECU according to the embodiment.

FIG. 10 is a flowchart showing a sequence of urea injection control processing executed by the ECU.

In Step S1, it is distinguished whether a urea fault flag $F_{UREANG}$ is "1". This urea fault flag $F_{UREANG}$ is set to "1" when it is determined that the urea injection device has failed in determination processing, which is not illustrated, and is set to "0" at times except for this. In a case of this determination being YES, Step S9 is advanced to, and after the urea injection amount $G_{UREA}$ has been set to "0", this processing ends. In a case of this determination being NO, Step S2 is advanced to.

In Step S2, it is distinguished whether a catalyst degradation flag $F_{SCRNG}$ is "1". This catalyst degradation flag $F_{SCRNG}$ is set to "1" when it is determined that either the first selective reduction catalyst and the second selective reduction catalyst has failed in the determination processing, which is not illustrated, and is set to "0" at times except for this. In a case of this determination being YES, Step S9 is advanced to, and after the urea injection amount $G_{UREA}$ has been set to "0", this processing ends. In a case of this determination being NO, Step S3 is advanced to.

In Step S3, it is determined whether a urea remaining amount $Q_{UREA}$ is less than a predetermined value $Q_{REF}$. This urea remaining amount $Q_{UREA}$ indicates the remaining amount of urea water in the urea tank, and is calculated based on the output of the urea level sensor. In a case of this determination being YES, Step S4 is advanced to, and in a case of being NO, Step S5 is advanced to.

In Step S4, a urea remaining amount warning light is illuminated, Step S9 is advanced to, and after the urea injection amount $G_{UREA}$ has been set to "0", this processing ends.

In Step S5, it is determined whether a catalyst warm-up timer value $T_{MAST}$ is larger than a predetermined value $T_{MLMT}$. This catalyst warm-up timer value $T_{MAST}$ is a value keeping the warm-up time of the selective reduction catalyst after engine startup. In a case of this determination being YES, Step S6 is advanced to. In a case of this determination being NO, Step S9 is advanced to, and after the urea injection amount $G_{UREA}$ has been set to "0", this processing ends.

In Step S6, it is distinguished whether a sensor fault flag $F_{SENNG}$ is "0". This sensor fault flag $F_{SENNG}$ is set to "1" when it is determined that the ammonia sensor or the catalyst temperature sensor has failed in the determination processing, which is not illustrated, and is set to "0" at times except for this. In a case of this determination being YES, Step S7 is advanced to. In a case of this determination being NO, Step S9 is advanced to, and after the urea injection amount $G_{UREA}$ has UREA been set to "0", this processing ends.

In Step S7, it is distinguished whether an ammonia sensor activity flag $F_{NH3ACT}$ is 1. This ammonia sensor activity flag $F_{NH3ACT}$ is set to "1" when it is determined that the ammonia sensor has reached an active state in determination processing, which is not illustrated, and is set to "0" at times except for this. In a case of this determination being YES, Step S8 is advanced to. In a case of this determination being NO, Step S9 is advanced to, and after the urea injection amount $G_{UREA}$ has been set to "0", this processing ends.

In Step S8, it is distinguished whether the temperature $T_{SCR}$ of the first selective reduction catalyst is higher than a predetermined value $T_{SCR\_ACT}$. In a case of this determination being YES, it is determined that the first selective reduction catalyst has been activated, and Step S10 is advanced to. In a case of this determination being NO, it is determined that the first selective reduction catalyst has not been activated yet and that urea injection should be stopped, Step S9 is advanced to, and after the urea injection amount $G_{UREA}$ has been set to "0", this processing ends.

In Step S10, the virtual target value $DNH3_{CONS\_TRGT\_F}$ is calculated based on the formulas (5) and (6) by the aforementioned target value filter 521, and Step S11 is advanced to.

In Step S11, the corrected target ammonia concentration $DNH3_{CONS\_TRGT\_MOD}$ is calculated based on the formulas (7) and (8) by the aforementioned target value correction unit 522, and Step S12 is advanced to.

In Step S12, the model parameters a1, a2, b1 and b2 are calculated based on the formulas (9) to (15) by the aforementioned identifier 53, and Step S13 is advanced to.

In Step S13, the predicted ammonia concentration $PREDNH3_{EXS}$ is calculated based on the formulas (27) to (35) by the aforementioned predictor 511, and Step S14 is advanced to.

In Step S14, the evaluation function value J is calculated based on the formula (39) by the aforementioned evaluation function value calculating unit 512, and Step S15 is advanced to.

In Step S15, the optimum injection amount $DG_{UREA\_OPT}$ (FB injection amount $G_{UREA\_FB}$) and search input $DG_{UREA\_EXS}$ are calculated based on the formulas (42) to (51) by the aforementioned extremum searching optimization unit 513, and Step S16 is advanced to.

In Step S16, the FF injection amount $G_{UREA\_FF}$ (reference injection amount $G_{UREA\_BS}$) is calculated based on the formulas (53) and (54), and Step S17 is advanced to.

In Step S17, the urea injection amount $G_{UREA}$ is calculated based on formula (1) by the adder 54, and this processing ends.

Next, the results of an example of control by way of the ECU of the present embodiment will be explained while referring to FIG. 11.

Figure 11:
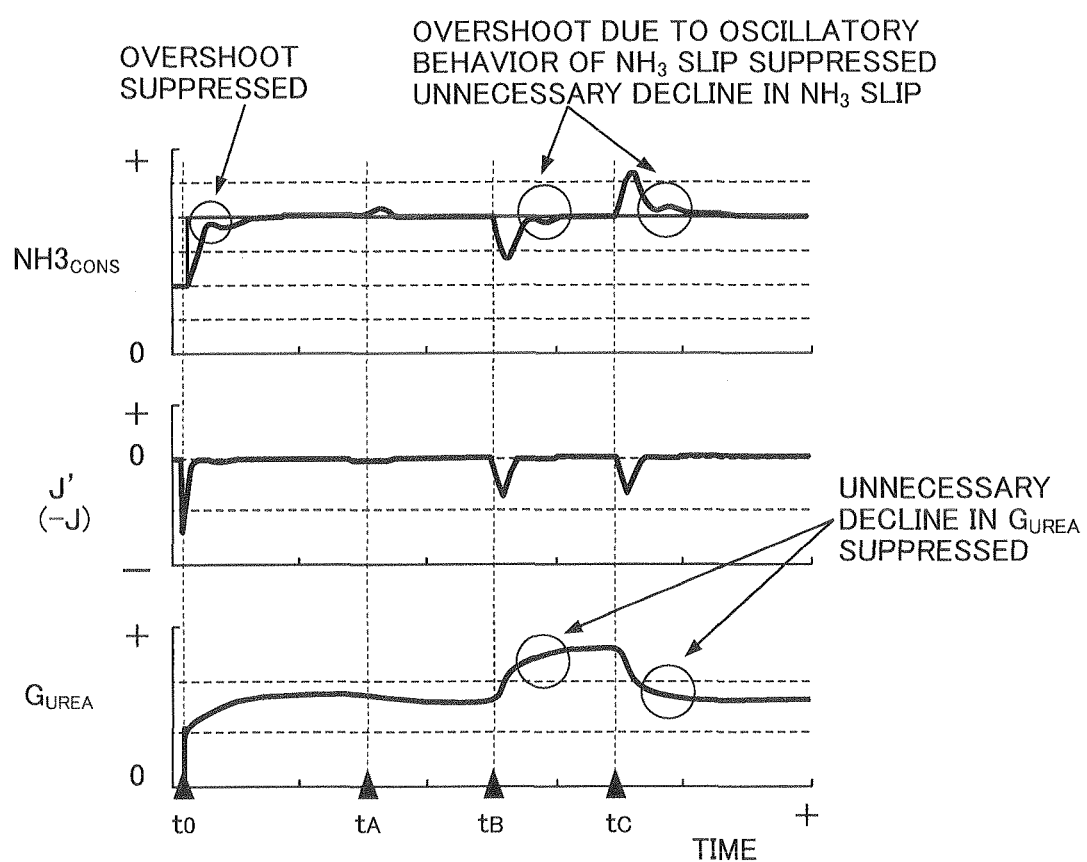
FIG. 11 presents graphs showing relationships between the detected ammonia concentration, the evaluation function value, and the urea injection amount in a case of performing urea injection control by way of the ECU according to the embodiment.

FIG. 11 presents graphs showing relationships between the detected ammonia concentration $NH3_{CONS}$, the evaluation function value J', and the urea injection amount $G_{UREA}$ in a case of performing urea injection control by way of the ECU of the present embodiment. It should be noted that this example shown in FIG. 11 is an example of performing control under the same conditions as the aforementioned example shown in FIG. 3. In other words, after the target ammonia concentration $NH3_{CONS\_TRGT}$ is made to increase step-wise from "0" to a predetermined value at the time $t_0$, modeling error and noise is imparted at time $t_A$, time $t_B$, and time $t_C$.

In the aforementioned example of conventional control shown in FIG. 3, immediately after the target ammonia concentration $NH3_{CONS\_TRGT}$ is made to change step-wise at time $t_0$, and immediately after noise or modeling error is applied at times $t_A$, $t_B$, and $t_C$, the detected ammonia concentration $NH3_{CONS}$ shows overshoot and oscillatory behavior relative to the target ammonia concentration $NH3_{CONS\_TRGT}$.

In addition, the urea injection amount $G_{UREA}$ is decreased more than necessary in response to such overshoot and oscillatory behavior of the detected ammonia concentration $NH3_{CONS}$.

In contrast, it has been confirmed that, in the example of control of the present embodiment shown in FIG. 11, such overshoot and oscillatory behavior of the detected ammonia concentration $NH3_{CONS}$ when the target ammonia concentration $NH3_{CONS\_TRGT}$ is made to change, and the overshoot and oscillatory behavior of the detected ammonia concentration $NH3_{CONS}$ immediately after noise and modeling error is applied are suppressed. In addition, it has also been confirmed that, by suppressing such overshoot and oscillatory behavior of the detected ammonia concentration $NH3_{CONS}$, the urea injection amount $G_{UREA}$ is not decreased more than necessary.

Moreover, it could be confirmed that the ECU of the present embodiment can reduce the computational load on the order of several to tens of times compared to model prediction control by convention evaluation norm, by calculating the urea injection amount $G_{UREA}$ by way of the aforementioned such virtual plant 515 and extremum searching algorithm of the extremum searching optimization unit 513. Therefore, even in a case in which a computing device having high computing power cannot be used due to being in an adverse environment such as high temperature, high humidity, high vibration, or dust, it is possible to perform control with high precision using an ECU of a simple configuration.

Second Embodiment

Next, a second embodiment of the present invention will be explained while referring to the drawings.

Figure 12:
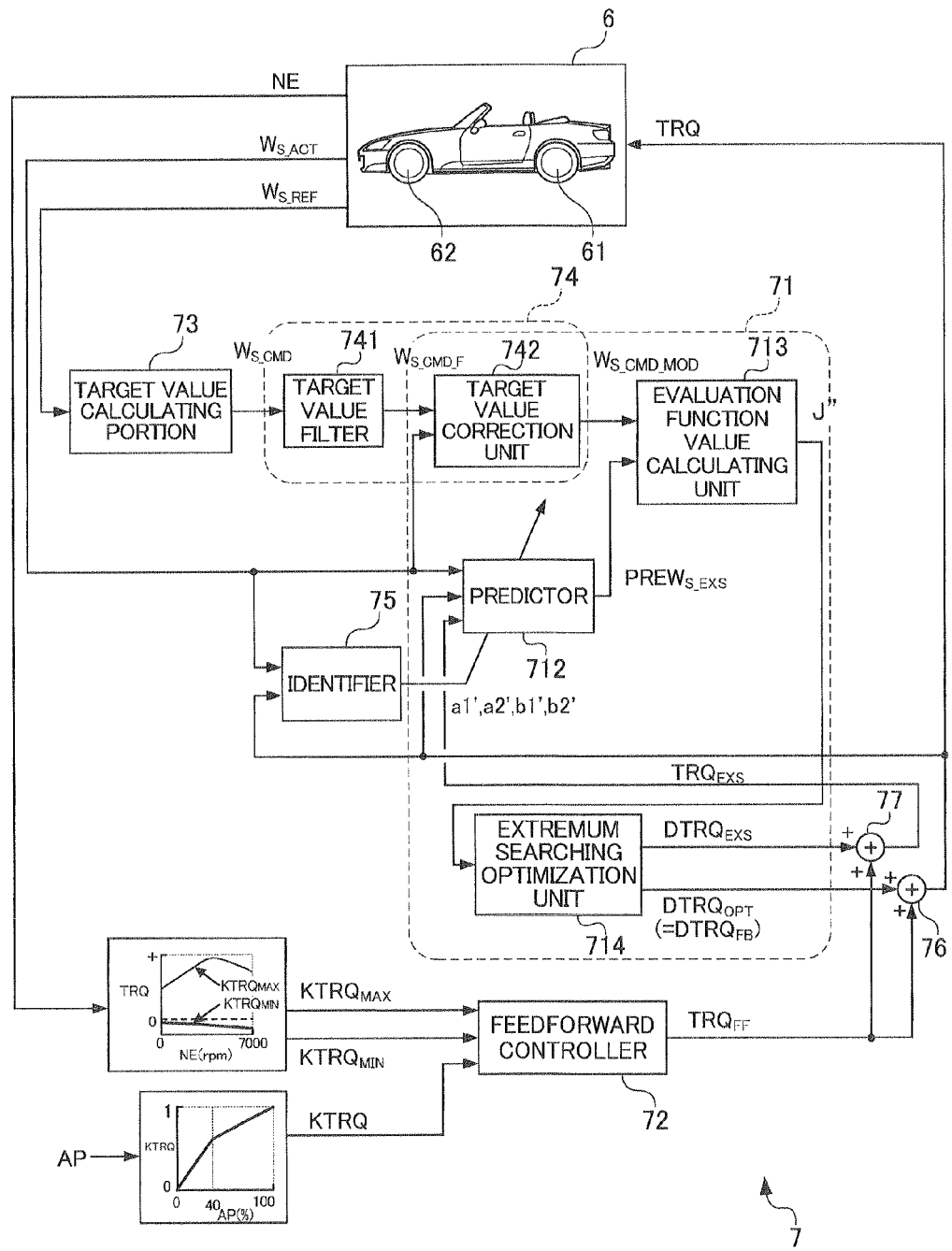
FIG. 12 is a schematic diagram showing configurations of an ECU and a vehicle controlled by this ECU according to a second embodiment of the present invention.

FIG. 12 is a schematic diagram showing configurations of an ECU 7 as a control device and a vehicle 6 as a plant controlled by this ECU 6 according to the second embodiment of the present invention.

This vehicle 6 includes drive wheels 61 and undriven wheels 62, and an unillustrated engine that generates torque for rotationally driving the drive wheels 61.

The ECU 7 calculates the target value of torque (hereinafter referred to as "target torque") TRQ of the engine in the vehicle 6, and inputs this target torque TRQ to the vehicle 6 as a control input value. In addition, a drive-wheel speed sensor (not illustrated) that detects the rotational speed (hereinafter referred to as "drive-wheel speed") $W_{S\_ACT}$ of the drive wheels 61 that are rotationally driven is provided to the vehicle 6, and the detected value $W_{S\_ACT}$ of this drive-wheel speed sensor is output to the ECU 7 as a control output value.

For example, when excessive torque acts on the drive wheels 61 such as during acceleration of the vehicle 6, the drive wheels 61 will excessively spin relative to the undriven wheels 62, and the stability and acceleration of the vehicle will decline considerably. This ECU 7 prevents such excessive spinning of the drive wheels 61 by calculating the target torque TRQ so that the drive-wheel speed $W_{S\_ACT}$ matches a predetermined target speed. In other words, a so-called traction control system is configured by this vehicle 6 and ECU 7. Hereinafter, configurations of modules of the ECU 7 in this traction control system will be explained.

The modules shown in FIG. 12 are configured to include a feedback controller 71, feedforward controller 72, target value calculating portion 73, target value correction portion 74, identifier 75, and a plurality of adders 76 and 77.

The target value calculating portion 73 calculates a target value of the drive-wheel speed $W_{S\_ACT}$ (hereinafter referred to as "target wheel speed") $W_{S\_CMD}$ based on the rotational speed (hereinafter referred to as "undriven wheel speed") $W_{S\_REF}$ of the undriven wheels 62 output from the vehicle 6, as explained in detail later.

As explained in detail later, the feedback controller 71 includes a target value correction unit 742, predictor 712, evaluation function value calculating unit 713, and extremum searching optimization unit 714, and calculates a feedback torque (hereinafter referred to as "FB torque") $DTRQ_{FB}$, so that the drive-wheel speed $W_{S\_ACT}$ matches the target wheel speed $W_{S\_CMD}$.

The feedforward controller 72 calculates a feedforward torque (hereinafter referred to as "FF torque") $TRQ_{FF}$ based on the revolution speed of the engine (hereinafter referred to as "engine revolution speed") and a depression amount AP of the accelerator pedal output from the vehicle 6, as explained in detail later.

The adder 76 calculates the target torque TRQ by adding an FB torque $DTRQ_{FB}$ calculated by the feedback controller 71 and the FF torque $TRQ_{FF}$ calculated by the feedforward controller 72, as shown in the following formula (58), and inputs this to the vehicle 6 as a control input value.

$$TRQ = TRQ_{FF} + DTRQ_{FB} \quad (58)$$

The target value correction portion 74 calculates a corrected target wheel speed $W_{S\_CMD\_MOD}$ by conducting a predetermined operation on the target wheel speed $W_{S\_CMD}$ in order to prevent overshoot and oscillatory behavior of the drive wheel speed $W_{S\_ACT}$ relative to the target wheel speed $W_{S\_CMD}$, as explained in detailed later.

The identifier 75 identifies a plurality of model parameters a1', a2', b1' and b2' used by the predictor 712 of the feedback controller 71, as explained in detail later.

It should be noted that an operation by the respective modules shown in FIG. 12 every different control cycle. Hereinafter, the control cycle of the adders 76 and 77, i.e. the update period of a search input $TRQ_{EXS}$ described later and the target torque TRQ, is set to ΔTc. In addition, the control cycle of the identifier 75 and the feedforward controller 72 is also set to ΔTc. In other words, the update periods of the model parameters a1', a2', b1' and b2' and the FF torque $TRQ_{FF}$ are also set to ΔTc. It should be noted that this update period ΔTc is set to approximately 0.002 seconds in the present embodiment, for example.

Hereinafter, the configuration of each module will be explained in detail.

Configuration of Target Value Calculating Portion

The configuration of the target value calculating portion 73 will be explained.

The target value calculating portion 73 calculates the target wheel speed $W_{S\_CMD}$ of the drive wheel speed $W_{S\_ACT}$ based on the undriven wheel speed $W_{S\_REF}$ output from the vehicle 6. More specifically, the target wheel speed $W_{S\_CMD}$ is calculated by adding a predetermined wheel slip offset amount $OPT_{SLIP}$ to the undriven wheel speed $W_{S\_REF}$, as shown in the following formula (59). In other words, this wheel slip offset amount $OPT_{SLIP}$ corresponds to an allowable slip amount between the drive wheels 61 and the undriven wheels 62.

$$W_{S\_CMD}(m) = W_{S\_REF}(m) + OPT_{SLIP} \quad (59)$$

Herein, the notation "m" is a notation indicating discretized time, and indicates being data detected or calculated every update period ΔTc of the aforementioned target torque TRQ.

In addition, although a predetermined constant is set as the wheel slip offset amount $OPT_{SLIP}$ in the present embodiment, it is not limited thereto. For example, it may be determined based on parameters such as an estimated value of the road surface coefficient of friction, a detected value of a steering wheel angle, a detected value of a yaw rate sensor, and a detected value of a car body slip angle.

Configuration of Target Value Correction Portion

The configuration of the target value correction portion 74 will be explained.

The target value correction portion 74 is configured to include a target value filter 741 and a target value correction unit 742, and calculates a corrected target wheel speed $W_{S\_CMD\_MOD}$ by the sequence shown in the following formulas (60) to (63).

The target value filter 741 is a so-called first-order lag filter. In other words, the target value filter 741 calculates a virtual target value $W_{S\_CMD\_F}$ by performing the operation shown in the following formulas (60) and (61) on the target wheel speed $W_{S\_CMD}$ calculated.

$$W_{S\_CMD}(k+i) = W_{S\_CMD}(k) \quad (i=0\sim mp) \quad (60)$$

$$W_{S\_CMD\_F}(k+i) = -POLE_F W_{S\_CMD\_F}(k+i-1) + \quad (61)$$
$$(1 + POLE_{F'}) W_{S\_CMD}(k+i) \quad (i = 0 \sim mp)$$

Herein, the notation "k" is notation indicating discretized time, and indicates being data detected or calculated every model sampling period ΔTm described later.

In addition, $POLE_F'$ is a tracking characteristic designating parameter for designating the tracking characteristic of the drive wheel speed $W_{S\_ACT}$ relative to the target wheel speed $W_{S\_CMD}$, and $POLE_{F'}$ is set to be greater than −1 and less than 0. In addition, mp in the above formulas (60) and (61) is a positive integer, and indicates a prediction step number (step number for which ΔTm is set as the control cycle) in a predictor 712.

The target value correction unit 742 calculates the corrected target wheel speed $W_{S\_CMD\_MOD}$ according to the response delay characteristic of the drive wheel speed $W_{S\_ACT}$ as shown in the following formulas (62) and (63), in order to prevent overshoot and oscillatory behavior of the drive wheel speed $W_{S\_ACT}$ relative to the target wheel speed $W_{S\_CMD}$.

More specifically, this target value correction unit 742 first calculates deviation Ew between the drive wheel speed $W_{S\_ACT}$ and the virtual target value $W_{S\_CMD\_F}$, as shown in the following formula (62).

$$Ew(k) = W_{S\_ACT}(k) - W_{S\_CMD\_F}(k) \quad (62)$$

Next, the corrected target wheel speed $W_{S\_CMD\_MOD}$ is calculated by adding a damping term proportional to the deviation Ew to the virtual target value $W_{S\_CMD\_F}$, as shown in the following formula (63).

$$W_{S\_CMD\_MOD}(k+i) = W_{S\_CMD\_F}(k) + (1+POLE_{E'})^i Ew(k) \quad (63)$$

Herein, $POLE_{E'}$ contained in the damping term of the above formula (63) is a deviation convergence characteristic designating parameter for designating the convergence characteristic of the deviation Ew, and $POLE_{E'}$ is set to be greater than −1 and less than 0. In the above way, the corrected target wheel speed $W_{S\_CMD\_MOD}(k+1)$, which is a target value of a future time (k+1), is set between the target wheel speed $W_{S\_CMD}(k+1)$ at a future time and a future predicted value of the drive wheel speed $W_{S\_ACT}$ (predicted drive wheel speed $PREW_{S\_EXS}(k+1)$ described later), taking into account of the response delay characteristic of the drive wheel speed $W_{S\_ACT}$.

Configuration of Identifier

The configuration of the identifier 75 will be explained.

The identifier 75 identifies the plurality of model parameters a1', a2', b1' and b2' of a plant model used by the predictor 712 by way of the recursive identification algorithms (generalized recursive least-squares method algorithms) shown in the following formulas (64) to (70). More specifically, a current control value θ(m) of a model parameter vector is calculated based on a latest control value ξ' of processing object data and a previous control value θ(m−1) of the model parameter vector.

The θ'(m) and ξ(m) are respectively defined as 4-component vectors, as shown in the following formulas (64) and (65).

$$\theta'^T(m) = [a1'(m)\, a2'(m)\, b1'(m)\, b2'(m)] \quad (64)$$

$$\zeta'^T(m) = [W_{S\_ACT}(m-Mmi)\, W_{S\_ACT}(m-2Mmi)\, TRQ(m-Mmi)\, TRQ(m-2Mmi)] \quad (65)$$

Herein, the notation "m" is a notation indicating discretized time, and indicates data detected or calculated every aforementioned control period ΔTc. In addition, this control cycle ΔTc and model sampling period ΔTm satisfy the following formula (66).

$$\Delta Tm = Mmc \Delta Tc \quad (66)$$

According to the recursive identification algorithms, the current control value θ'(m) of the model parameter vector defining the model parameters a1', a2', b1' and b2' as components is calculated from the previous control value θ'(m−1) by the following formula (67).

$$\theta'(m) = \theta'(m-1) + KP'(m)\, ide'(m) \quad (67)$$

Herein, ide'(m) in the above formula (67) indicates identification error defined by the following formula (68). KP'(m) indicates a gain coefficient vector defined by the following formula (69). P'(m) in the following formula (69) is the fourth-order square matrix defined by the following formula (70). In addition, I in the following formula (70) indicates a fourth-order unit matrix, and λ1' and λ2' respectively indicate weighting parameters.

$$ide(m) = \theta'^T(m-1)\zeta(m) \quad (68)$$

$$KP'(m) = \frac{P'(m)\zeta'(m)}{1 + \zeta'(m)^T P'(m)\zeta'(m)} \quad (69)$$

$$P'(m+1) = \frac{1}{\lambda 1'}\left\{ I - \frac{\lambda 2' P'(m)\zeta'(m)\zeta'(m)^T}{\lambda 1' + \lambda 2' \zeta'(m)^T P'(m)\zeta'(m)} \right\} P'(m) \quad (70)$$

Herein, the various recursive identification algorithms can be selected as shown below, by setting the weighting parameters λ1' and λ2' of the above formula (70) as follows.

λ1'=1, λ2'=0: fixed gain algorithm
λ1'=1, λ2'=1: least-squares method algorithm
λ1'=1, λ2'=λ: gradual decrease algorithm (0<λ<1)
λ1'=λ, λ2'=1: weighted least-squared method algorithm (0<λ<1)

By occasionally identifying the model parameters a1', a2', b1' and b2' by way of the identifier 75 in the above way, it is possible to prevent the control precision from declining, even in a case of modeling error arising in the plant model described later due to individual variation or degradation over time of the vehicle.

Configuration of Feedback Controller

The configuration of the feedback controller 71 will be explained.

The feedback controller 71 is configured to include the aforementioned target value correction unit 742 that calculates the corrected target wheel speed $W_{S\_CMD\_MOD}$, the predictor 712 that calculates the predicted drive wheel speed $PREW_{S\_EXS}$ as a future predicted value of the drive wheel speed $W_{S\_ACT}$, a evaluation function value calculating unit 713 that calculates an evaluation function value J" based on this corrected target wheel speed $W_{S\_CMD\_MOD}$ and predicted drive wheel speed $PREW_{S\_EXS}$, and the extremum searching optimization unit 714 that calculates an optimum torque $DTRQ_{OPT}$ and search input $DTRQ_{EXS}$ such that the evaluation function value J" calculated becomes an extremum, i.e. becomes a minimum value.

In addition, the extremum searching optimization unit 714 searches for a minimum value of the evaluation function value J" using the periodic reference signal $S_{REF}$' as described in detail later. Consequently, the extremum searching optimization unit 714 inputs the optimum torque $DTRQ_{OPT}$ not containing the component of this reference signal $S_{REF}$ and the search input $DTRQ_{EXS}$ containing the component of the reference signal $S_{REF}$ into the aforementioned predictor 712.

In addition, the optimum torque $DTRQ_{OPT}$ not containing the component of the reference signal $S_{REF}$, becomes the FB torque $DTRQ_{FB}$.

Moreover, the control cycle of this feedback controller 71 is basically ΔTe, which is shorter than the update period ΔTc of the target torque TRQ. Therefore, the update period ΔTe of this optimum torque $DTRQ_{OPT}$ and search input $DTRQ_{EXS}$ becomes shorter than the update period ΔTc of the target torque TRQ. The details of this control cycle ΔTe will be explained later in detail.

Hereinafter, the configurations of this predictor 712, evaluation function value calculating unit 713, and extremum searching optimization unit 714 will be explained in order.

Configuration of Predictor

The configuration of the predictor 712 will be explained.

The predictor 712 calculates a predicted drive wheel speed $PREW_{S\_EXS}$ based on the drive wheel speed $W_{S\_ACT}$, target torque TRQ, and search input $TRQ_{EXS}$ containing the component of the reference signal $S_{REF}$. Herein, the sum of adding, by way of the adder 77, the FF torque $TRQ_{FF}$ to the search input $DTRQ_{EXS}$ calculated by the extremum searching optimization unit 714 is used in the search input $TRQ_{EXS}$ input to the predictor 712. In addition, when calculating the predicted drive wheel speed $PREW_{S\_EXS}$, this predictor 712 uses a model of the vehicle (hereinafter referred to as "plant model") showing the dynamic characteristic of the drive wheel speed $W_{S\_ACT}$ from the target torque TRQ.

The optimum form of this plant model is derived as the following formulas (71) to (79), similarly to the formulas (27) to (35) of the plant model in the aforementioned first embodiment.

Predicted drive wheel speed after 1—model sample time $$PREW_{S\_EXS}(n + MmcMce) = a1'(n, k-1) W_{S\_ACT}(n) + \\ a2'(n, k-1) W_{S\_ACT}(n - MmiMie) + b1'(n, k-1) TRQ_{EXS}(n) + \\ b2'(n, k-1) TRQ(n, k-1) \, (\cong W_{S\_ACT}(k+1)) \quad (71)$$

Predicted drive wheel speed after 2—model sample times $$PREW_{S\_EXS}(n + 2MmcMce) = \qquad (72)$$
$$a1'(n, k - 1)PREW_{S\_CNT}(n + MmcMce) +$$
$$a2'(n, k - 1)W_{S\_ACT}(n) + b1'(n, k - 1)TRQ_{EXS}(n) +$$
$$b2'(n, k - 1)TRQ(n, k)(\cong W_{S\_ACT}(k + 2))$$

$$PREW_{S\_CNT}(n + MmiMie) = \qquad (73)$$
$$a1'(n, k - 1)W_{S\_ACT}(n) + a2'(n, k - 1)W_{S\_ACT}(n - MmiMie) +$$
$$b1'(n, k - 1)TRQ(n, k) + b2'(n, k - 1)TRQ(n, k - 1)$$

Predicted drive wheel speed after 3—model sample times $$PREW_{S\_EXS}(n + 3MmcMce) = \qquad (74)$$
$$a1'(n, k - 1)PREW_{S\_CNT}(n + 2MmcMce) +$$
$$a2'(n, k - 1)PREW_{S\_CNT}(n + MmcMce) + b1'(n, k - 1)$$
$$TRQ_{EXS}(n) + b2'(n, k - 1)TRQ(n, k)(\cong W_{S\_ACT}(k + 3))$$

$$PREW_{S\_CNT}(n + 2MmcMce) = \qquad (75)$$
$$a1'(n, k - 1)PREW_{S\_CNT}(n + MmcMce) + a2'(n, k - 1)W_{S\_ACT}(n) +$$
$$b1'(n, k - 1)TRQ(n, k) + b2'(n, k - 1)TRQ(n, k)$$

Predicted drive wheel speed after 4—model sample times $$PREW_{S\_EXS}(n + 4MmcMce) = \qquad (76)$$
$$a1'(n, k - 1)PREW_{S\_CNT}(n + 3MmcMce) +$$
$$a2'(n, k - 1)PREW_{S\_CNT}(n + 2MmcMce) + b1'(n, k - 1)$$
$$TRQ_{EXS}(n) + b2'(n, k - 1)TRQ(n, k)(\cong W_{S\_ACT}(k + 4))$$

$$PREW_{S\_CNT}(n + 3MmcMce) = \qquad (77)$$
$$a1'(n, k - 1)PREW_{S\_CNT}(n + 2MmcMce) +$$
$$a2'(n, k - 1)PREW_{S\_CNT}(n + MmcMce) +$$
$$b1'(n, k - 1)TRQ(n, k) + b2'(n, k - 1)TRQ(n, k)$$

Predicted drive wheel speed after mp—model sample times $$PREW_{S\_EXS}(n + mpMmcMce) = \qquad (78)$$
$$a1'(n, k - 1)PREW_{S\_CNT}(n + (mp - 1)MmcMce) +$$
$$a2'(n, k - 1)PREW_{S\_CNT}(n + (mp - 2)MmcMce) +$$
$$b1'(n, k - 1)TRQ_{EXS}(n) +$$
$$b2'(n, k - 1)TRQ(n, k)(\cong W_{S\_ACT}(k + mp))$$

$$PREW_{S\_CNT}(n + (mp - 1)MmcMce) = \qquad (79)$$
$$a1'(n, k - 1)PREW_{S\_CNT}(n + (mp - 2)MmcMce) +$$
$$a2'(n, k - 1)PREW_{S\_CNT}(n + (mp - 1)MmcMce) +$$
$$b1'(n, k - 1)TRQ(n, k) + b2'(n, k - 1)TRQ(n, k)$$

Herein, the notation "n" is a notation indicating discretized time, and indicates being data detected or calculated every control cycle $\Delta Te$. In addition, this control cycle $\Delta Te$ and model sampling period $\Delta Tm$ satisfy the following formula (80).

$$\Delta Tm = Mmc\Delta Tc = Mmc \, Mce\Delta Te \qquad (80)$$

Moreover, in the above formulas (71) to (79), the model parameters $a1'(n,k)$, $a2'(n,k)$, $b1'(n,k)$ and $b2'(n,k)$ and the target torque $TRQ(n,k)$ respectively indicate parameters updated at the period $\Delta Tc$ as described above, and being parameters oversampled at the shorter period $\Delta Te$.

Configuration of evaluation Function Value Calculating Unit

The configuration of the evaluation function value calculating unit 713 will be explained.

The evaluation function value calculating unit 713 calculates the evaluation function value J'', such as that shown in the following formula (81), based on the square sum of the deviation between the predicted drive wheel speed $PREW_{S\_EXS}$ calculated by the predictor 712, and the corrected target wheel speed $W_{S\_CMD\_MOD}$ calculated by the target value correction unit 742.

$$J''(n) = \sum_{i=1}^{mp} (PREW_{S\_EXS}(n + MmcMcei) - W_{S\_CMD\_MOD}(k + 1))^2 \qquad (81)$$

Configuration of Extremum Searching Optimization Unit

The configuration of the extremum searching optimization unit 714 will be explained.

The extremum searching optimization unit 714 calculates the optimum torque $DTRQ_{OPT}$ and search input $DTRQ_{EXS}$ such that the evaluation function value J'' becomes a minimum by the sequence shown in the following formulas (82) to (92). More specifically, it first calculates the moving average value $C_{R\_AVE'}$ using the reference signal $S_{REF'}$, based on the following formulas (82) to (87).

$$J^*(n) = -J''(n) \qquad (82)$$

$$J_{WF'}(n) = 0.5J^*(n) - 0.5J^*(n-1) \qquad (83)$$

$$S_{REF'}(n) = A_{REF'} \sin(2\pi F_{REF'} n\Delta Te) \qquad (84)$$

$$C_{R'}(n) = J_{WF'}(n)S_{REF'}(n) \qquad (85)$$

$$C_{R\_AVE'}(n) = \sum_{i=0}^{N_{AVE'}} C_{R'}(n - i) \qquad (86)$$

$$N_{AVE'} = j\frac{1}{F_{REF'}\Delta Te} \qquad (87)$$

Furthermore, it calculates the optimum torque $DTRQ_{OPT}$ and search input $DTRQ_{EXS}$ based on the algorithm of sliding mode control as shown in the following formulas (88) to (92), so that the moving average value $C_{R\_AVE'}$ becomes "0".

$$DTRQ_{OPT}(n) = DTRQ_{RCH}(n) + DTRQ_{ADP}(n) \qquad (88)$$

$$DTRQ_{RCH}(n) = K_{RCH}\sigma'(n) \qquad (89)$$

$$DTRQ_{ADP}(n) = K_{ADP'} \sum_{i=1}^{n} \sigma'(i) \qquad (90)$$

$$\sigma'(n) = C_{R\_AVE'}(n) + S'C_{R\_AVE'}(n-1) \qquad (91)$$

$$DTRQ_{EXS}(n) = DTRQ_{OPT}(n) + S_{REF'}(n) \qquad (92)$$

Configuration of Feedforward Controller

The configuration of the feedforward controller 72 will be explained.

The feedforward controller 72 calculates the FF torque $TRQ_{FF}$ based on the following formula (93).

$$TRQ_{FF}(m) = KTRQ_{MIN}(k) + KTRQ(k)(KTRQ_{MAX}(k) - KTRQ_{MIN}(k)) \qquad (93)$$

Figure 13:
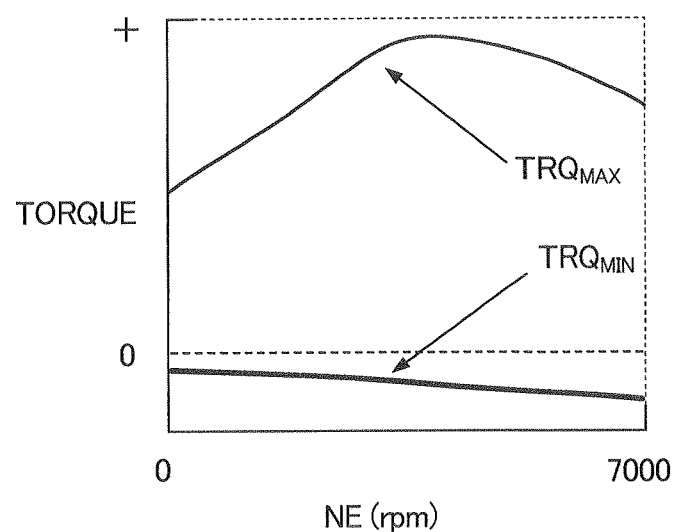
FIG. 13 is a graph showing a relationship between a torque value and an engine revolution speed according to the embodiment.
Figure 14:
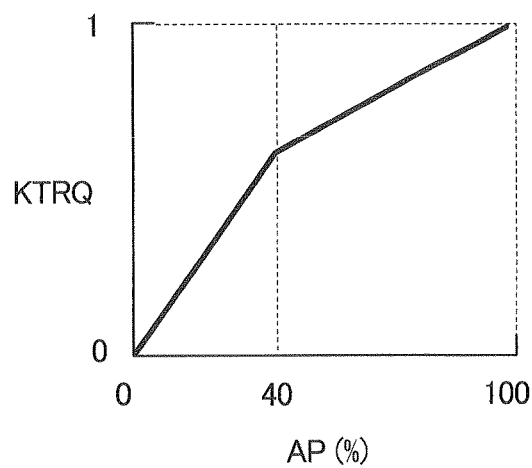
FIG. 14 is a graph showing a relationship between a coefficient and an accelerator opening according to the embodiment.

In the above formula (93), the torque values $KTRQ_{MIN}$ and $KTRQ_{MAX}$ are determined according to the engine revolution sped NE, based on the map shown in FIG. 13. In addition, the coefficient KTRQ is determined according to the accelerator opening AP, based on the map shown in FIG. 14.

Next, the results of an example of control by the ECU of the present embodiment will be explained while referring to FIG. 15.

Figure 15:
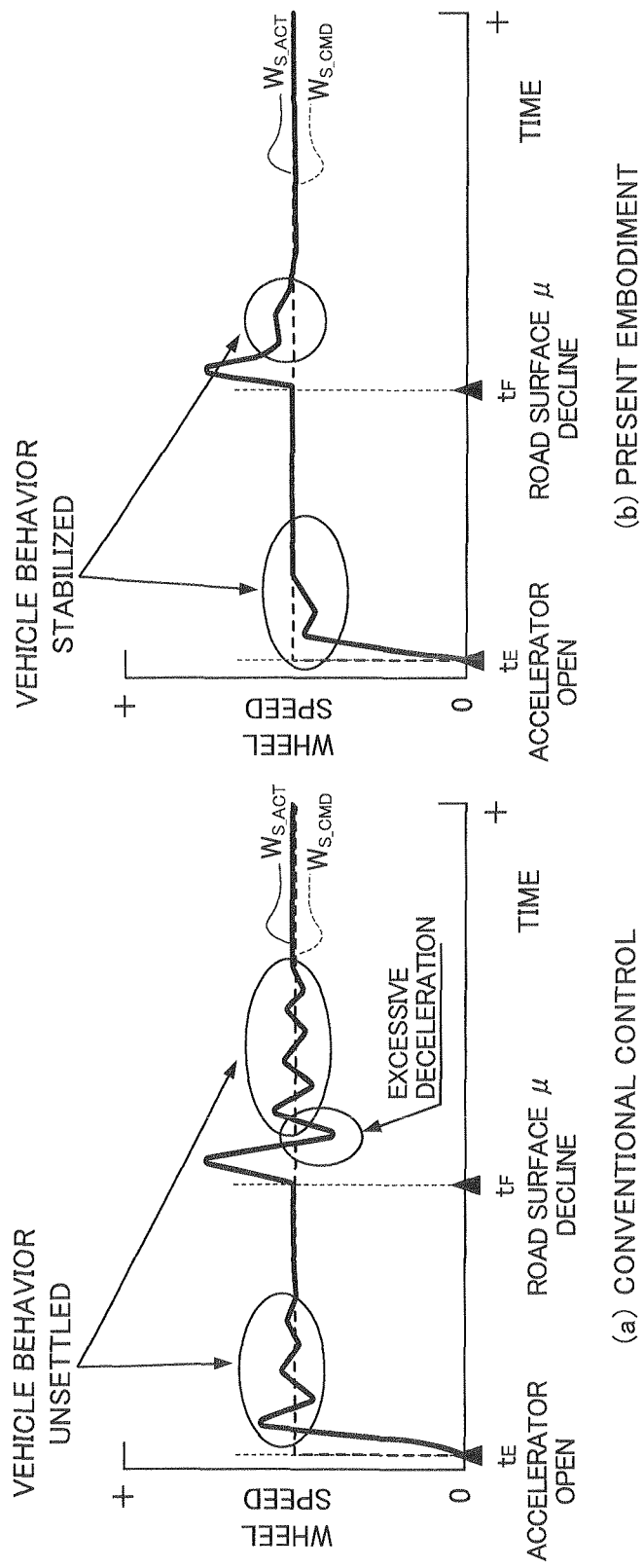
FIG. 15 presents graphs showing examples of control by the ECU according to the embodiment.
Figure 16:
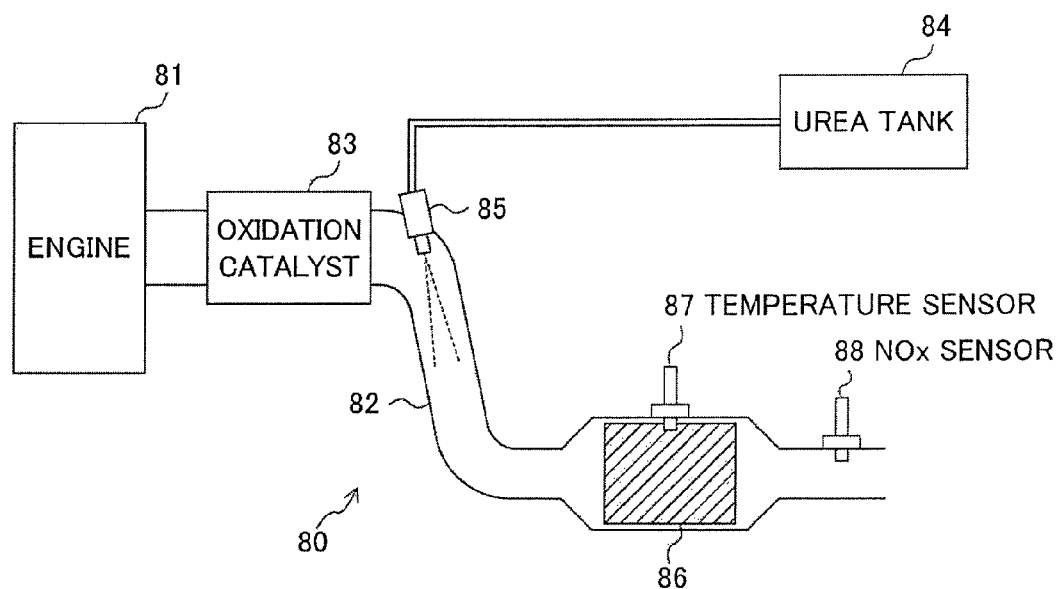
FIG. 16 is a schematic diagram showing a configuration of a conventional exhaust purification device.
Figure 17:
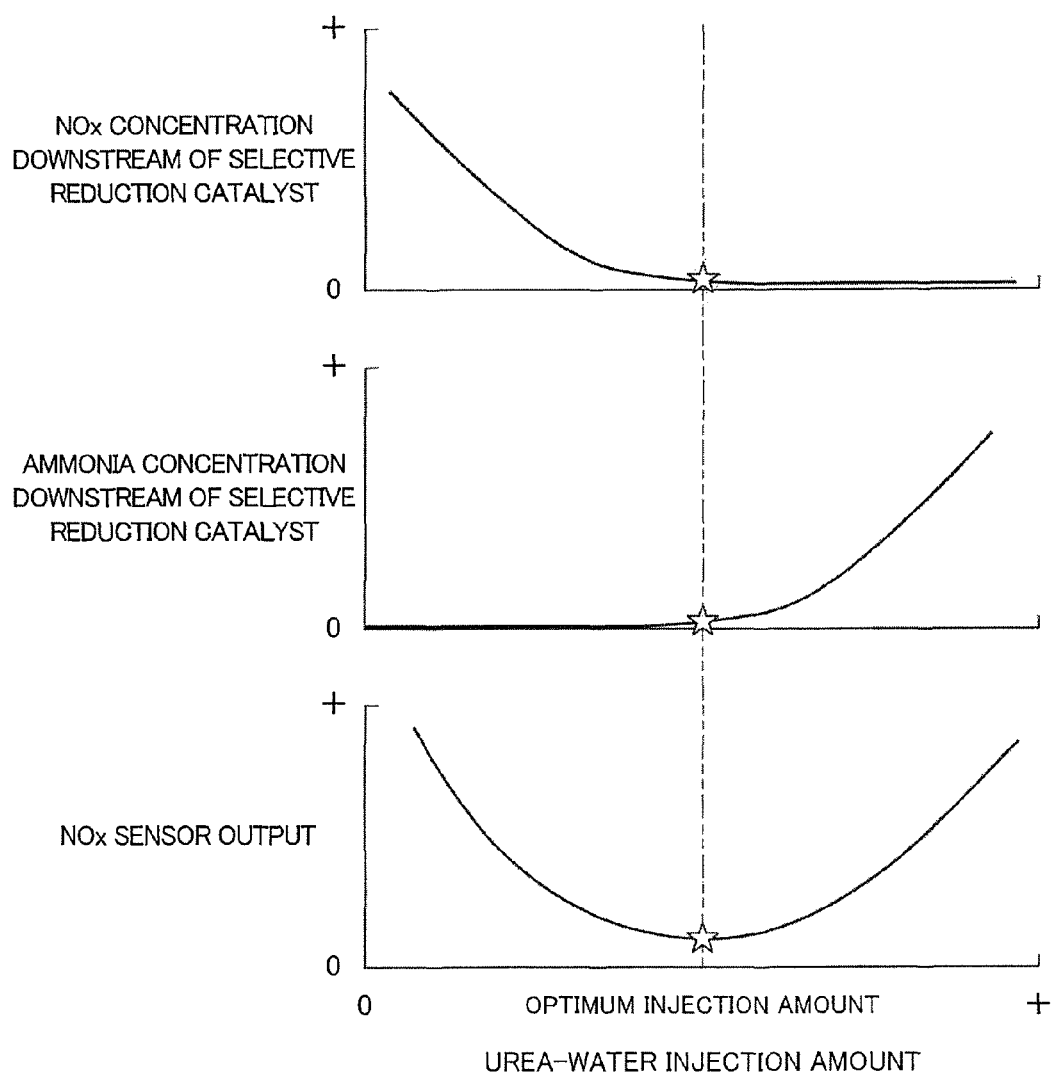
FIG. 17 presents graphs showing relationships between a NOx emission amount and ammonia emission amount downstream of a selective reduction catalyst and the output of the NOx sensor in the conventional exhaust purification device.
Figure 18:
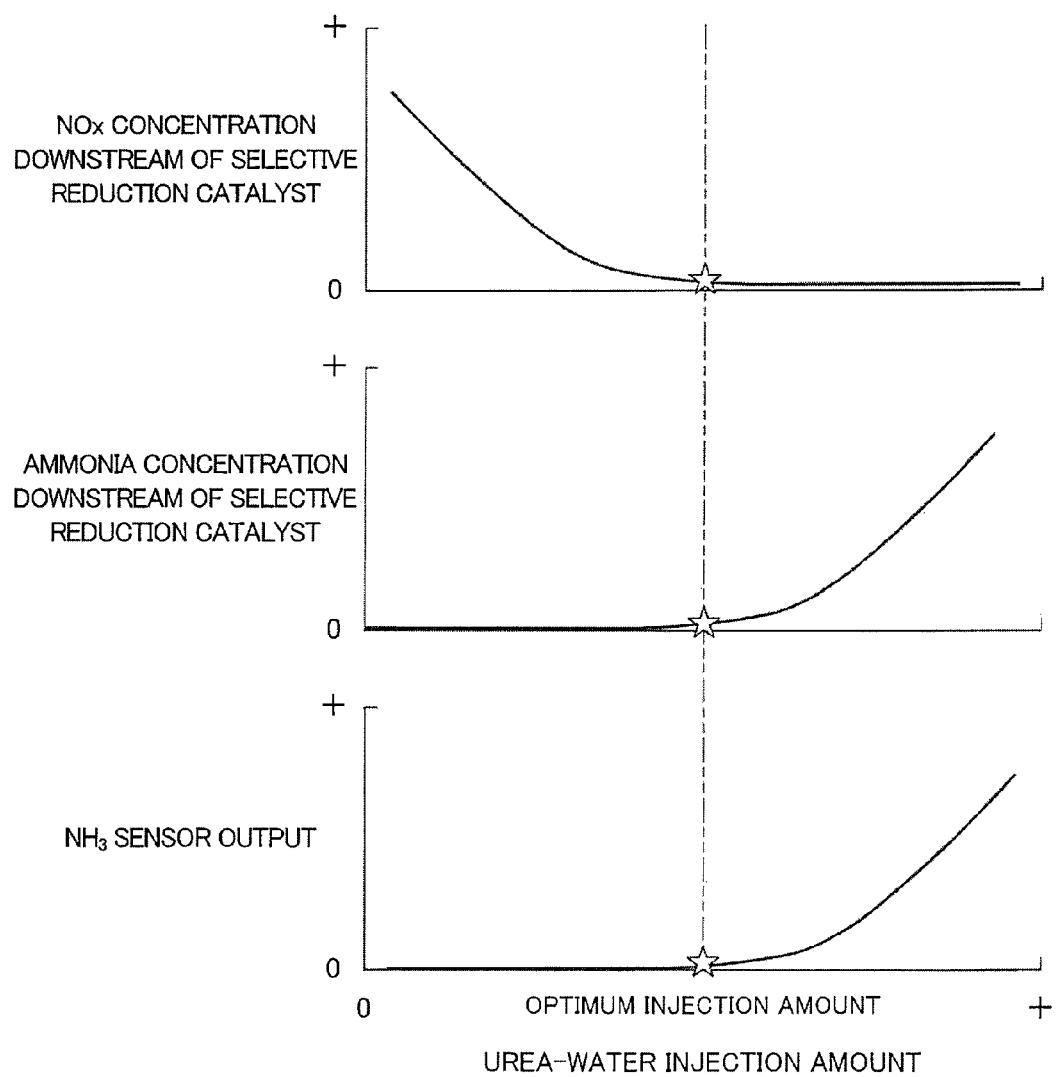
FIG. 18 presents graphs showing relationships between the NOx emission amount and ammonia emission amount downstream of the selective reduction catalyst in a conventional exhaust purification device using an ammonia sensor.

FIG. 15 shows examples of control, in which FIG. 15(a) shows an example of control by a conventional PID controller, and FIG. 15(b) shows an example of control by the ECU of the present embodiment. It should be noted that FIG. 15 shows examples of control in a case in which the accelerator is depressed at the time $t_E$ from a state in which the vehicle is stopped, and thereafter, the road surface coefficient of friction suddenly declines at the time $t_F$.

As shown in FIG. 15(a), in the case of using convention PID control, if the accelerator is depressed and the target wheel speed $W_{S\_CMD}$ changes step-wise, the drive wheel speed $W_{S\_ACT}$ shows overshoot and oscillatory behavior relative to this target wheel speed $W_{S\_CMD}$. In other words, both the acceleration and the stability of the vehicle decline considerably. In contrast, as shown in FIG. 15(b), such overshoot and oscillatory behavior is suppressed in a case of using the ECU of the present embodiment. Therefore, both the acceleration and stability of the vehicle can be maintained.

In addition, even in a case of the road surface coefficient of friction declining, the drive wheel speed $W_{S\_ACT}$ oscillates greatly relative to the target wheel speed $W_{S\_CMD}$, and the behavior of the vehicle is unsettled in the case of using conventional PID control. In addition, excessive deceleration occurs accompanying this. In contrast, in the case of using the ECU of the present embodiment, stable driving is made possible, without the behavior of the vehicle being unsettled in this way.

It should be noted that the present invention is not limited to the aforementioned embodiments, and various modifications thereto are possible.

Although the aforementioned first embodiment and second embodiment have explained a control device of an exhaust purification device and a traction control system as plants having a characteristic of a large response delay, it is not limited to this. The present invention is effective for any type of plant, so long as being a control object having a large response delay. In particular, it is more effective if a plant in which the dead time is short relative to the length of the response delay.

For the ECU 3 of the above-mentioned first embodiment, although the exhaust purification device 2 equipped with the two selective reduction catalysts 231 and 232 is set as the control object, it is not limited thereto. The controller of the present invention can quickly and highly precisely control a detected value in a plant having a characteristic of a large response delay to a target value. Therefore, even in a case of an exhaust purification device equipped with only one selective reduction catalyst being set as the control object, it is possible to suppress ammonia slip while maintaining a high NOx reduction rate.

In addition, for the control device of the afore-mentioned second embodiment, although a vehicle equipped with an engine as a drive source is set as the control object, it is not limited thereto. For example, it may be a fuel cell vehicle or electric automobile with a motor as the drive source.

The invention claimed is:

1. A controller for controlling a plant, comprising:
 a predicted value calculating means for calculating, using a plant model showing a dynamic characteristic of a control output value from a control input value of the plant, a future predicted value of the control output value based on a provisional value of the control input value containing a periodic reference signal;
 an evaluation function value calculating means for calculating an evaluation function value containing the calculated future predicted value of the control output value;
 an extremum searching means for calculating, based on a product of the calculated evaluation function value and the periodic reference signal, a provisional value of the control input value that results in an extremum of the calculated evaluation function value; and
 a control input value calculating means for calculating the control input value containing the calculated provisional value of the control input value.

2. The controller according to claim 1, wherein an update period of the provisional value of the control input value is shorter than an update period of the control input value.

3. The controller according to claim 1, further comprising a target value correction means for setting, for a target value of the control output value, a corrected target value of the control output value between the target value of the control output value and the control output value,
 wherein the evaluation function value calculating means calculates the evaluation function value based on a deviation between the set corrected target value of the control output value and the calculated future predicted value of the control output value.

4. The controller according to claim 1, wherein the predicted value calculating means calculates future predicted values with respect to the control output value at a plurality of different times, and
 wherein the evaluation function value calculating means calculates the evaluation function value containing the calculated future predicted values with respect to the control output value at the plurality of different times.

5. The controller according to claim 4,
 wherein the plant model showing the dynamic characteristic of the control output value from the control input value of the plant includes a plurality of control input terms proportional to the control input value, and a plurality of control output terms proportional to the control output value, and
 wherein the predicted value calculating means calculates the future predicted value of the control output value at a plurality of different times by recursively using output of the plant model in the control output terms.

6. The controller according to claim 5, wherein the predicted value calculating means calculates the future predicted value of the control output value at a plurality of different times by recursively using, in the control output terms, output of the plant model in which a provisional value of the control input value not containing the periodic reference signal is used in the control input terms.

7. The controller according to claim 5, wherein the predicted value calculating means uses the provisional value of the control input value containing a periodic reference signal only in a portion of the plurality of control input terms.

8. The controller according to claim 1, wherein the plant is an exhaust purification device including:
 a selective reduction catalyst that is provided in an exhaust channel of an internal combustion engine, and reduces NOx flowing through the exhaust channel;
 a reducing agent supply means for supplying a reducing agent into the exhaust channel on an upstream side of the selective reduction catalyst, the selective reduction catalyst reducing the NOx flowing through the exhaust channel in the presence of the reducing agent; and an exhaust detection means for detecting exhaust in the exhaust channel on a downstream side of the selective reduction catalyst, wherein control output values of the plant include an output value of the exhaust detection means, and wherein control input values of the plant include a supply amount of the reducing agent from the reducing agent supply means.

9. The controller according to claim 1, wherein the plant is a vehicle including:

a wheel;

a drive source that produces torque for rotationally driving the wheel; and a drive wheel speed detection means for detecting a rotational speed of the wheel that is rotationally driven by the drive source, wherein control output values of the plant include a detected value of the drive wheel speed detection means, and wherein control input values of the plant include a target value of torque of the drive source.

* * * * *